US009007651B2

(12) United States Patent
Asai et al.

(10) Patent No.: US 9,007,651 B2
(45) Date of Patent: Apr. 14, 2015

(54) THRESHOLD MATRIX GENERATION METHOD, IMAGE DATA GENERATION METHOD, IMAGE DATA GENERATION APPARATUS, IMAGE RECORDING APPARATUS, AND RECORDING MEDIUM

(71) Applicant: Dainippon Screen Mfg. Co., Ltd, Kyoto-shi, Kyoto (JP)

(72) Inventors: Hiroshi Asai, Kyoto (JP); Ikuhiko Takahama, Kyoto (JP)

(73) Assignee: Dainippon Screen Mfg. Co., Ltd., Kyoto (JP)

( * ) Notice: Subject to any disclaimer, the term of this patent is extended or adjusted under 35 U.S.C. 154(b) by 0 days.

(21) Appl. No.: 14/313,638

(22) Filed: Jun. 24, 2014

(65) Prior Publication Data
US 2015/0002868 A1 Jan. 1, 2015

(30) Foreign Application Priority Data

Jun. 27, 2013 (JP) ................................. 2013-134909

(51) Int. Cl.
| G06F 15/00 | (2006.01) |
| H04N 1/40 | (2006.01) |
| G06K 15/00 | (2006.01) |
| H04N 1/46 | (2006.01) |
| G06K 15/02 | (2006.01) |

(52) U.S. Cl.
CPC .... G06K 15/1806 (2013.01); *G06K 2215/0082* (2013.01)

(58) Field of Classification Search
None
See application file for complete search history.

(56) References Cited

U.S. PATENT DOCUMENTS

| 7,965,418 | B2 * | 6/2011 | Yamada et al. | 358/3.05 |
| 2004/0252346 | A1 | 12/2004 | Huang et al. | |
| 2005/0195440 | A1 * | 9/2005 | Inoue | 358/3.14 |
| 2008/0291500 | A1 * | 11/2008 | Asai | 358/3.06 |
| 2009/0080002 | A1 * | 3/2009 | Nakano et al. | 358/1.7 |

(Continued)

FOREIGN PATENT DOCUMENTS

| EA | 2785040 A1 | 1/2014 |
| JP | 10071744 A | 3/1998 |

(Continued)

OTHER PUBLICATIONS

Extended European Search Report issued on Nov. 4, 2014 for European Patent Application No. 14/170,973.3.

*Primary Examiner* — Thomas Lett

(74) *Attorney, Agent, or Firm* — McDermott Will & Emery LLP

(57) ABSTRACT

In the generation of a threshold matrix for Nx speed writing, first and second areas are set, the first area being a cluster of a plurality of first partial areas substantially evenly distributed in a matrix space, and the second area being an area of the matrix space excluding the first area. Next, at least two writing elements in each of the first partial areas are allocated occurrence numbers and changed into determined elements. Then, at least one writing element in the second area is allocated an occurrence number and changed into a determined element. Thereafter, the other writing elements are allocated occurrence numbers and changed into determined elements. In accordance with the occurrence numbers, the threshold value of each writing element is determined to obtain a threshold matrix for Nx speed writing. This results in a reduction in the graininess of an image in a highlight area.

18 Claims, 13 Drawing Sheets

(56) References Cited

U.S. PATENT DOCUMENTS

2010/0027074 A1    2/2010   Chang
2013/0010339 A1*   1/2013   Yoshizawa .................... 358/505

FOREIGN PATENT DOCUMENTS

| | | |
|---|---|---|
| JP | 2008-294702 A | 12/2008 |
| JP | 2009-061727 A | 3/2009 |

* cited by examiner

THRESHOLD MATRIX GENERATION METHOD, IMAGE DATA GENERATION METHOD, IMAGE DATA GENERATION APPARATUS, IMAGE RECORDING APPARATUS, AND RECORDING MEDIUM

TECHNICAL FIELD

The present invention relates to a technique for generating a threshold matrix to be compared with a multi-tone original image when screening the original image.

BACKGROUND ART

Conventionally, multi-tone original images, or in other words, continuous-tone original images, have been screened into halftone dots and recorded on recording media. In screening original images, amplitude modulated (AM) screening or frequency modulated (FM) screening is used. In AM screening, gradations are expressed by changing the size of halftone dots without changing the number of halftone dots. In FM screening, on the other hand, gradations are expressed by changing the distribution density of irregularly arranged microdots, which are minimum pixel units.

Inkjet image recording apparatuses or the like often perform screening through FM screening. In the case of screening a multi-tone original image into halftone dots through FM screening, generally a threshold matrix in which a plurality of elements are arranged in both row and column directions and are each given a threshold value is generated and prepared in advance, and this threshold matrix is compared with the original image.

A technique for generating a threshold matrix is disclosed in, for example, Japanese Patent Application Laid-Open Nos. 2008-294702 (Document 1) and 2009-61727 (Document 2). In the threshold matrix generation method of Document 1, a plurality of linear areas extending in a direction inclined relative to row and column directions are preset in a matrix area. Then, the linear areas are alternately allocated to a first element group and a second element group. In each of the element groups, the order in which dots are lit is determined by repeating processing for specifying one of the elements and then specifying an element that is most distant from the specified element. The threshold value of each element is determined in accordance with this order.

On the other hand, Document 2 discloses a technique for recording an image at 2× (double) speed, using an image reduced by half in a width direction corresponding to the row direction of the pixel array. In 2×-speed writing, an image is recorded while suppressing degradation in image quality by enlarging the reduced image in the width direction and writing dots in a checkerboard pattern in the row and column directions with respect to writing positions in normal writing.

Incidentally, when inkjet image recording apparatuses or the like perform high-speed image recording, landing positions of fine ink droplets ejected from an inkjet head onto an object on which an image is to be recorded (hereinafter, a "recording object") may differ from desired positions. If the landing positions of ink are disordered when recording an image that has been screened into halftone dots through FM screening, the density of dots on a recording object may be biased, and graininess may increase (i.e., graininess may deteriorate) in, for example, a highlight area (i.e., a bright portion) where the image has low gradation values. On the other hand, screening performed through AM screening can reduce graininess, but there is the possibility of moires occurring as a result of interference between the periodicity of the arrangement of regularly arranged halftone dots and the periodicity of the arrangement of nozzles in an inkjet head.

SUMMARY OF INVENTION

It is an object of the present invention to reduce the graininess of an image to be recorded by an image recording apparatus.

The present invention is intended for a threshold matrix generation method of generating a threshold matrix for Nx speed writing that is to be compared with a multi-tone original image when the original image is screened into halftone dots for Nx speed writing by an image recording apparatus capable of recording an image at 1× speed or at Nx speed, where N is an integer of 2 or more.

A threshold matrix generation method according to an embodiment of the present invention includes a) preparing a matrix space that is a set of matrix elements arranged in row and column directions, the row direction being perpendicular to the column direction, and the column direction corresponding to a recording direction of the image recording apparatus, b) setting every Nth matrix element aligned in the column direction and every Nth matrix element aligned in the row direction as writing elements and setting the other matrix elements as non-writing elements, the writing elements being matrix elements that correspond to writing positions on a recording object at the time of Nx speed writing, c) setting a first area and a second area, the first area being a cluster of a plurality of first partial areas that are substantially evenly distributed in the matrix space and each include a plurality of writing elements, and the second area being the area of the matrix space excluding the first area, d) changing at least two writing elements in each of the first partial areas into determined elements by first allocating an initial occurrence number to one writing element in the first area to determine one writing element as a determined element and then, in consideration of repetitive application of the threshold matrix when performing screening of the original image, repeating processing for specifying a writing element that is distant from every determined element in the first area on the basis of a distance from every determined element and for allocating the next occurrence number to the specified writing element to change the specified writing element into a determined element, e) after the operation d), changing at least one writing element in the second area into a determined element and then changing another writing element into a determined element by repeatedly specifying a writing element that is distant from every determined element on the basis of a distance from every determined element and allocating an occurrence number to the specified writing element, in consideration of repetitive application of the threshold matrix when performing screening of the original image, and f) determining a threshold value of each writing element in accordance with the occurrence number to obtain a threshold matrix for Nx speed writing. According to the present invention, it is possible to reduce the graininess of an image (i.e., improve graininess).

In a preferred embodiment of the present invention, N is 2.

In another preferred embodiment of the present invention, the second area is a cluster of a plurality of second partial areas, the first partial areas and the second partial areas are all of the same size and shape, and the plurality of first partial areas and the plurality of second partial areas are alternately aligned in parallel in the row direction and alternately aligned in parallel in the column direction.

In another preferred embodiment of the present invention, in the operation d), the number of writing elements to be changed into determined elements in each of the first partial areas is smaller than the number of writing elements included in each of the first partial areas.

The present invention is also intended for an image data generation method of generating image data. The image data generation method according to the present invention includes preparing a threshold matrix that is generated by the threshold matrix generation method described above, and comparing a multi-tone original image with the threshold matrix to generate halftone image data obtained by screening the original image into halftone dots.

The present invention is also intended for an image data generation apparatus for generating image data. The image data generation apparatus according to the present invention includes a matrix storage part for storing a threshold matrix that is generated by the threshold matrix generation method described above, and an image data generation unit for comparing a multi-tone original image with the threshold matrix to generate halftone image data obtained by screening the original image into halftone dots.

The present invention is also intended for an image recording apparatus. The image recording apparatus includes a head part including a plurality of dot output elements that respectively write dots at a plurality of writing positions on a recording object, the plurality of writing positions being aligned in a width direction perpendicular to a recording direction, a movement mechanism for moving the plurality of writing positions on the recording object relative to the recording object in the recording direction, a matrix storage part for storing a threshold matrix that is generated by the threshold matrix generation method described above, an image data generation part for comparing a multi-tone original image with the threshold matrix to generate halftone image data obtained by screening the original image into halftone dots, and a control part for performing output control of the plurality of dot output elements on the basis of the halftone image data, in parallel with movement of the plurality of writing positions on the recording object relative to the recording object.

In a preferred embodiment of the image recording apparatus, when an image is recorded at Nx speed, the non-writing elements correspond to non-writable positions on the recording object.

In another preferred embodiment of the image recording apparatus, image recording is performed through one pass of the head part over each position on the recording object.

In another preferred embodiment of the image recording apparatus, sizes of dots to be written by the plurality of dot output elements are changeable, and only a minimum-sized dot is writable on the recording object in a range where a gradation value is greater than or equal to a minimum gradation value that can be expressed on the recording object and less than or equal to a predetermined gradation value.

The present invention is also intended for a non-transitory computer-readable recording medium storing a program for causing a computer to generate a threshold matrix by the above-described threshold matrix generation method.

The present invention is also intended for a non-transitory computer-readable recording medium storing a threshold matrix that is generated by the above-described threshold matrix generation method.

These and other objects, features, aspects and advantages of the present invention will become more apparent from the following detailed description of the present invention when taken in conjunction with the accompanying drawings.

DESCRIPTION OF EMBODIMENTS

Figure 1:
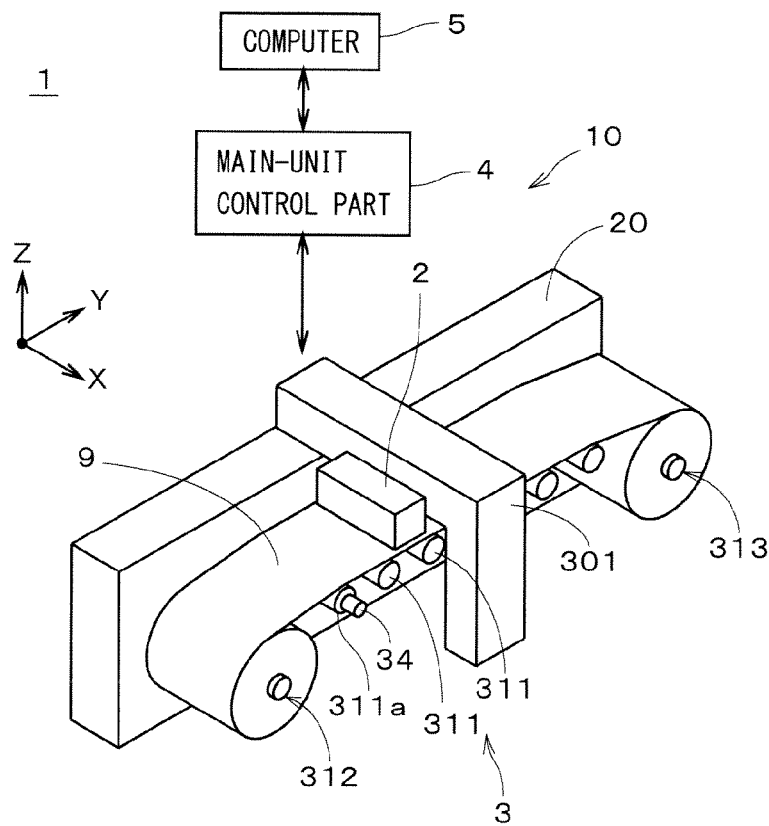
FIG. 1 illustrates a configuration of an image recording apparatus according to an embodiment of the present invention.

FIG. 1 illustrates a configuration of an image recording apparatus 1 according to an embodiment of the present invention. The image recording apparatus 1 is an apparatus that performs inkjet color printing on an object to be recorded (recording object) such as long-length (i.e., web-like) printing paper or film. The recording object is not limited to paper, but is hereinafter referred to as "recording paper 9." The image recording apparatus 1 records images onto a plurality of areas of the recording paper 9 that correspond to a plurality of pages, for example. Note that the image recording apparatus 1 may perform monochrome printing.

The image recording apparatus 1 shown in FIG. 1 includes a main unit 10 that records images onto the recording paper 9 while transferring the recording paper 9 in the −Y direction of FIG. 1, and a computer 5 connected to the main unit 10. The main unit 10 includes an ejection part 2 for ejecting fine droplets of ink toward the recording paper 9, a movement mechanism 3 for moving the recording paper 9 in the −Y direction of FIG. 1 below the ejection part 2, and a main-unit control part 4 connected to the ejection part 2 and the movement mechanism 3.

The movement mechanism 3 has a plurality of rollers 311 that are each long in a width direction and arranged in the Y direction. On the +Y side of the rollers 311 is provided a supply part 313 that holds a roll of pre-printing recording paper 9 and conveys the recording paper 9 from the roll in the −Y direction. On the −Y side of the rollers 311 is provided a taking-up part 312 that takes up and holds a recorded portion of the recording paper 9 in a roll. In the following description, paper that is simply referred to as the "recording paper 9" means the recording paper 9 being conveyed (i.e., the recording paper 9 on the rollers 121). One roller 311a of the movement mechanism 3 is provided with an encoder 34, and the moving speed of the recording paper 9 in the −Y direction is acquired on the basis of a pulse signal given from the encoder 34. The movement mechanism 3 is supported by a side wall part 20.

The ejecting part 2 is attached to a frame 301 that spans across the width of the recording paper 9. The ejecting part 2 includes a plurality of (in the present embodiment, four) head parts 23. The head parts 23 respectively eject color inks of cyan (C), magenta (M), yellow (Y), and black (K) and are arranged in the Y direction.

Figure 2:
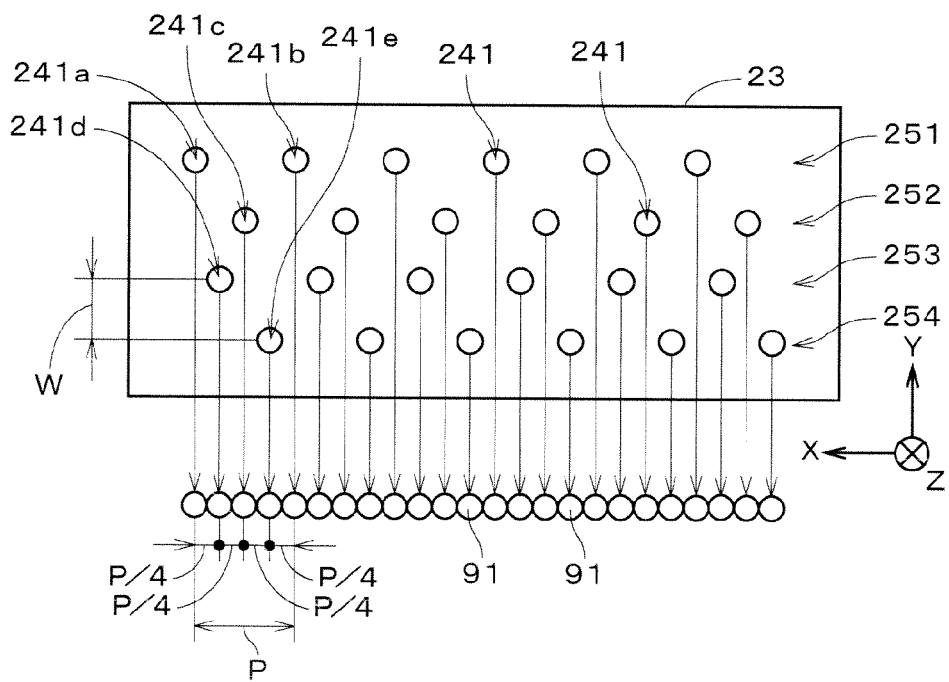
FIG. 2 illustrates an arrangement of outlets included in a head part.

The upper section of FIG. 2 illustrates outlets 241 included in one of the head parts 23, and the lower section of FIG. 2 illustrates dots 91 formed on the recording paper 9 by the outlets 241. Note that FIG. 2 is a virtual view of dots in which even dots that are not actually formed are illustrated. In the upper section of FIG. 2, the direction of movement of the recording paper 9 relative to the ejecting part 2 (i.e., the Y direction or the recording direction) is a vertical direction, and the number of outlets 241 shown is smaller than the actual number of outlets.

In the bottom surface of each head part 23 are provided a plurality of (in the present embodiment, four) outlet rows 251, 252, 253, and 254, each having a plurality of outlets 241 aligned at a fixed pitch P (hereinafter, referred to as an "outlet pitch P") in a direction that is perpendicular to the above movement direction and along the recording paper 9 (i.e., the X direction of FIG. 1 corresponding to the width of the recording paper 9, which is hereinafter referred to as a "width direction"). The outlet rows 251 to 254 are arranged at a fixed interval in the movement direction (Y direction). The interval in the movement direction between each pair of the outlet rows 251 to 254, that is, the interval indicated by an arrow W in the upper section of FIG. 2, is hereinafter referred to as a "row interval." The four outlet rows 251 to 254 in the upper section of FIG. 2 are respectively referred to as first to fourth outlet rows, in order from the +Y side to the −Y direction.

Focusing on only the width direction, the head part 23 has, between each two outlets of one outlet row that are adjacent to each other in the width direction, outlets of the other three outlet rows, one outlet each from each outlet row. Referring to for example, the first outlet row 251 that is the furthest to the +Y side, in the middle between outlets 241a and 241b in the upper section of FIG. 2 is disposed one outlet 241c of the second outlet row 252 that is the second furthest to the +Y side. In the middle between the outlets 241a and 241c is disposed one outlet 241d of the third outlet row 253 that is the third furthest to the +Y side, and in the middle between the outlets 241c and 241b is disposed one outlet 241e of the fourth outlet row 254 that is the furthest to the −Y side.

In this way, by arranging the plurality of outlet rows 251 to 254 in the movement direction while shifting the positions of the outlets 241 in the width direction, the head part 23 has a large number of outlets 241 arranged at a fixed pitch (precisely, a pitch that is one-fourth of the outlet pitch P of the outlet rows 251 to 254) in the width direction. Accordingly, as shown in the lower section of FIG. 2, it is possible to form a plurality of dots 91, which are aligned in the width direction, at each position in the movement direction on the recording paper 9.

In the image recording apparatus 1, the plurality of outlets 241 correspond to a plurality of dot output elements that respectively write dots 91 at a plurality of writing positions aligned in the width direction on the recording paper 9. The movement mechanism 3 is a mechanism for moving these writing positions on the recording paper 9 in the movement direction relative to the recording paper 9.

In the head part 23, each of the outlets 241 is provided with a piezoelectric element, and a fine droplet of ink is ejected from the outlet 241 toward the recording paper 9 by driving the piezoelectric element. In actuality, the outlets 241 are arranged across the entire width of a recording area on the recording paper 9 in the width direction, and image recording is performed through one pass of the head part 23 over each position on the recording paper 9. In other words, the image recording apparatus 1 is capable of high-speed single-pass image recording. Note that while the present embodiment describes a case in which the head parts 23 each include a plurality of outlet rows 251 to 254 formed as a single unit, the head parts 23 may be constructed by arranging head elements, each having one or several outlet rows formed as a single unit, in the X and Y directions.

Figure 3:
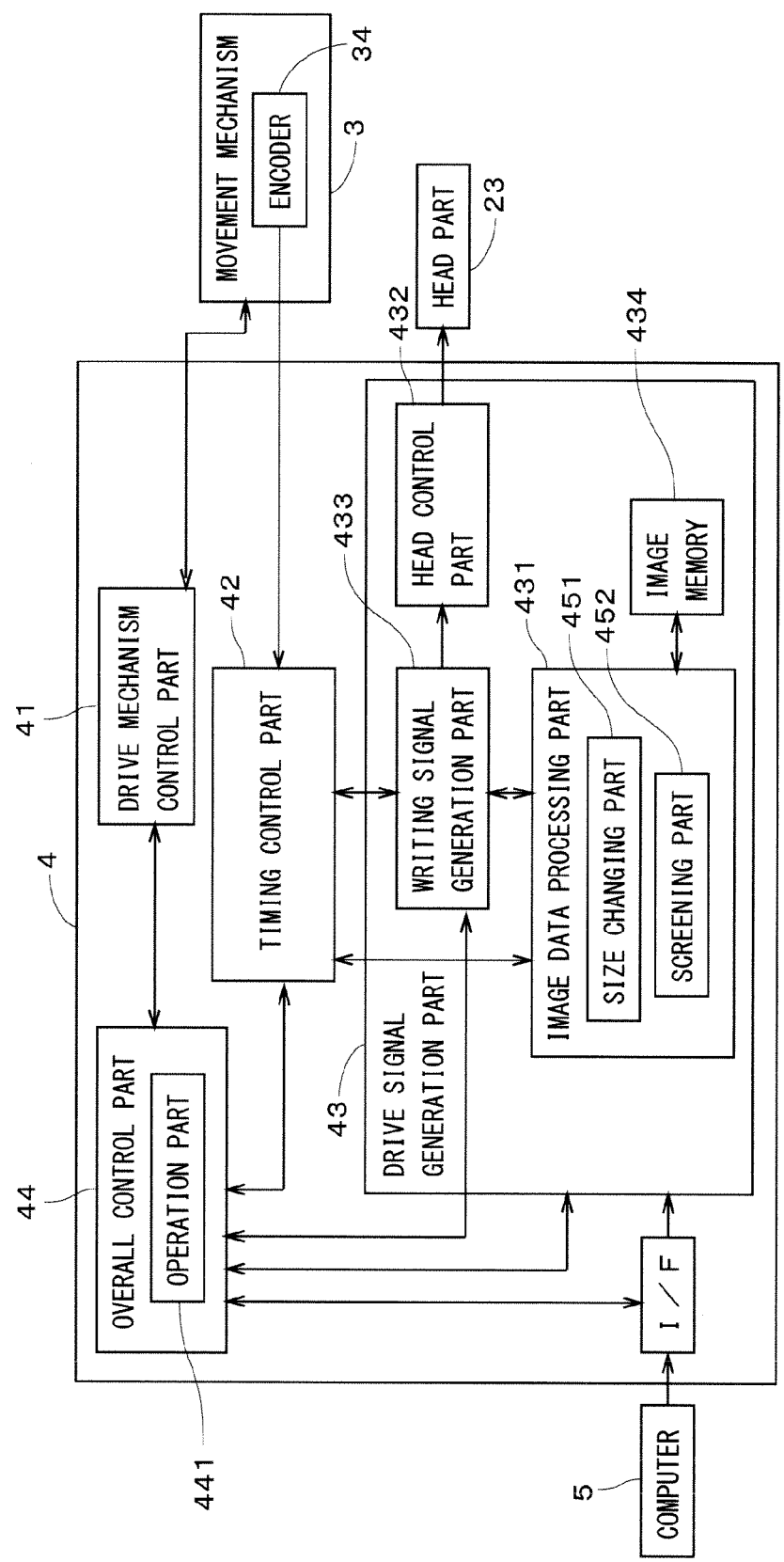
FIG. 3 is a block diagram showing a functional configuration of a main-unit control part.

FIG. 3 is a block diagram showing a functional configuration of the main-unit control part 4. The main-unit control part 4 includes a drive mechanism control part 41 for performing drive control of the movement mechanism 3, a timing control part 42 for receiving input of an encoder signal from the encoder 34 of the movement mechanism 3 and controlling ejection timing of fine droplets from the outlets 241 of the head parts 23, a drive signal generation part 43 connected to the computer 5 via an interface (I/F) and for inputting signals indicating operations of ejecting fine droplets of ink to the head parts 23, and an overall control part 44 for performing overall control of the main-unit control part 4. Although only one of the head parts 23 is shown in FIG. 3 for the sake of convenience, in actuality, the drive signal generation part 43 inputs signals to the plurality of head parts 23. The following description focuses on one of the head parts 23, but the same processing is also performed in the other head parts 23.

The drive signal generation part 43 includes an image data processing part 431 for generating processed image data based on an actual image recording operation from data of an original image (hereinafter, referred to as "original image data") that is input from the computer 5 and is to be recorded, a head control part 432 connected to the head part 23, a writing signal generation part 433 for generating a writing signal for the head part 23 on the basis of the processed image data input from the image data processing part 431, and an image memory 434.

In the basic processing performed by the drive signal generation part 43, the head control part 432 inputs a value indicating whether or not to eject a fine droplet of ink (a value of a writing signal) to a register, which is provided for each of the outlets 241 of the head part 231, on the basis of the processed image data. In the head control part 432, a set of signals corresponding to the values of the registers provided for the outlets 241 of the outlet rows 251 to 254 is input as drive signals to the head part 23. As a result, in each of the outlet rows 251 to 254, outlets 241 whose corresponding registers have received input of values indicating to eject (write) fine droplets of ink will eject fine droplets of ink, whereas outlets whose corresponding registers have received input of values indicating not to perform writing will perform a non-writing operation (e.g., making small oscillation movement that does not cause ejection of fine droplets of ink from the outlets 241).

In this way, the drive signals are input from the drive signal generation part 43 on the basis of the processed image data, and thereby drive control for causing each of the outlets 241 to perform an ejection operation of either ejecting a fine droplet of ink or not performing writing is performed simultaneously on the outlet rows 251 to 254 of the head part 23.

For the head part 23 used in the present embodiment, as in the case of a general inkjet head, the input cycle of drive signals is defined as a rated value for implementing high-precision image recording (hereinafter, the rated cycle is referred to as a "basic cycle"). In the actual image recording operation, the ejection operation is repeated at the basic cycle for each of the outlet rows 251 to 254 (in practice, a deviation within the range of ± several percent (%) are allowed).

Figure 4:
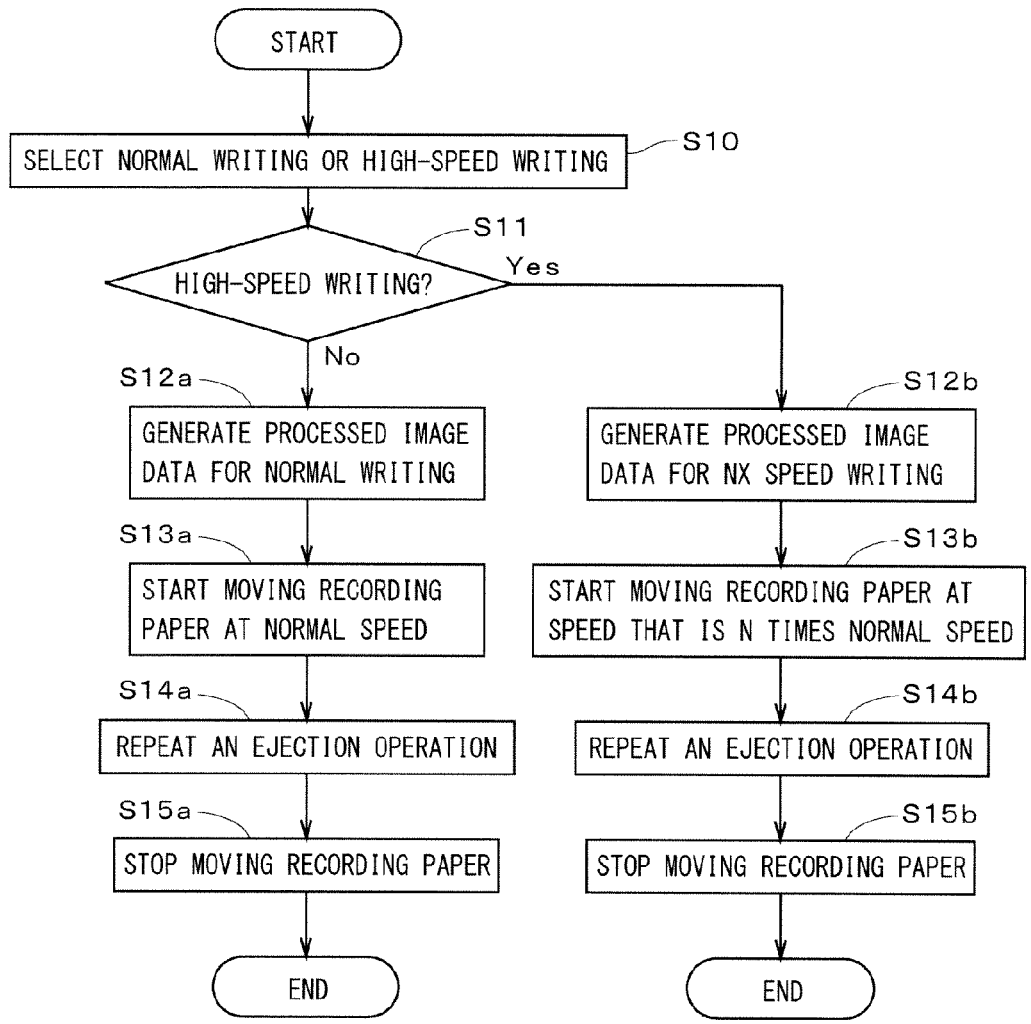
FIG. 4 is a flowchart of an image recording operation.

FIG. 4 is a flowchart of the image recording operation performed by the image recording apparatus 1. In the following description, the recording of dots is referred to as "writing" and an expression such as "an image is recorded by writing a plurality of dots" is used, but there is no particular need to strictly distinguish between "writing" and "recording." The image recording apparatus 1 is capable of selecting either normal writing or high-speed writing that is performed at higher speeds than the normal writing. Here, it is assumed that normal writing is selected by an operator and the computer 5 receives input indicating normal writing (step S10). Original image data is input in advance from the computer 5 and stored in the image memory 434. If it is determined that normal writing has been selected (step S11), the original image data is read out from the image memory 434, and a screening part 452 of the image data processing part 431 generates halftone image data that indicates a halftone image obtained by screening a multi-tone original image into halftone dots. The image data processing part 431 further generates processed image data based on the actual image recording operation from the halftone image data (step S12*a*).

When the processed image data has been generated (or part of the processed image data has been generated), the drive mechanism control part 41 drives the movement mechanism 3 to start moving the recording paper 9 (step S13*a*), as a result of which the recording paper 9 moves at a fixed speed (normal speed, described later). In parallel with the movement of the ejecting part 2 relative to the recording paper 9, the timing control part 42 repeatedly outputs an ejection timing signal at the basic cycle, and every time the ejection timing signal is input, the head control part 432 outputs drive signals to the head part 23 to repeatedly perform the ejection operation (i.e., normal writing) (step S14*a*).

As described above, the drive mechanism control part 41, the timing control part 42, the head control part 432, and the overall control part 44 function as a control part for performing output control of the head part 23, which includes a plurality of dot output elements, on the basis of the processed halftone image data for the head part 23, in parallel with the movement of a plurality of writing positions on the recording paper 9 relative to the recording paper 9.

Here, with the head part 23 in FIG. 2, the moving speed of the recording paper 9 (hereinafter, referred to as "normal speed," meaning 1× (single) speed) at which the row interval W, which is the center distance between a pair of outlets 241 adjacent in the movement direction, is an integral multiple (in the present embodiment, eight times) of the distance that the head part 23 moves relative to the recording paper 9 during the basic cycle, is predetermined. In normal writing, the ejection operations of all the outlets 241 of the four outlet rows 251 to 254 are simultaneously performed at the basic cycle while the recording paper 9 is continuously moved at the normal speed in the movement direction. Accordingly, regarding the non-writing operation as also being an operation of forming a virtual dot, the four outlet rows 251 to 254 perform dot forming operations of forming a plurality of dots aligned in the width direction.

Note that the resolution (i.e., the number of dots per unit distance represented by, for example, dpi (dots per inch)) in the movement direction of the image that is recorded by the four outlet rows 251 to 254 simultaneously performing ejection operations at the basic cycle while the recording paper 9 is moving at the normal speed in the movement direction is predetermined as a rated normal resolution of the head part 23. The resolution in the width direction of an image to be recorded takes a value corresponding to the reciprocal of a pitch (i.e., the distance between each pair of dots in the width direction) that is one-fourth of the outlet pitch P in the outlet rows 251 to 254.

When the entire image has been recorded on the recording paper 9, the movement of the recording paper 9 is stopped, and the image recording apparatus 1 ends the normal writing (step S15*a*).

Next is a description of the case where high-speed writing is selected in step S10 of FIG. 4. The image recording apparatus 1 is capable of recording while moving the recording paper 9 at a speed that is obtained by multiplying the normal speed by a submultiple of the number of outlet rows 251 to 254 of the head part 23. When high-speed writing has been selected in step S10 of FIG. 4, one of the submultiples (except one) of the number of outlet rows 251 to 254 is selected as an x-speed value by the operator. Input indicating the selected x-speed value (hereinafter, referred to as "selected x-speed value") is received by the computer 5, and the selected x-speed value is input to the overall control part 44 of the main-unit control part 4 in FIG. 3. Here, assume that a value "2," which is one of the submultiples of the number of outlet rows 251 to 254, is selected as the selected x-speed value.

If it is determined that high-speed writing with the selected x-speed value of 2 (hereinafter, also referred to as "2× speed writing") has been selected (step S11), an operation part 441 of the overall control part 44 inputs parameter values that correspond to the selected x-speed value to the drive mechanism control part 41, the timing control part 42, and the drive signal generation part 43. Then, the image data processing part 431 generates processed image data for 2× speed writing from the original image (step S12*b*). Note that steps S12*b* and S13*b* in FIG. 4 indicate generalized processing in which the selected x-speed value is N, where N is an integer of 2 or more.

After the processed image data (or part of the processed image data) has been generated by the image data processing part 431, the movement of the recording paper 9 is started (step S13*b*) and the recording paper 9 moves at a fixed speed obtained by multiplying the normal speed by the selected x-speed value (in the present exemplary operation, a speed that is twice the normal speed). In parallel with the movement of the ejecting part 2 relative to the recording paper 9, the head part 23 repeatedly performs ejection operations (i.e., high-speed writing) (step S14*b*).

To be more specific, at the same time as it is determined on the basis of the output from the encoder 34 that a predetermined recording start position or the vicinity thereof on the recording paper 9 has reached a position under (on the −Z side of) the first outlet row 251 (see the upper section of FIG. 2) that is the furthest to the +Y side, the timing control part 42 outputs ejection timing signals regarding the first and second outlet rows 251 and 252 to the drive signal generation part 43 and the overall control part 44 and then outputs ejection timing signals regarding the third and fourth outlet rows 253 and 254.

Figure 5:
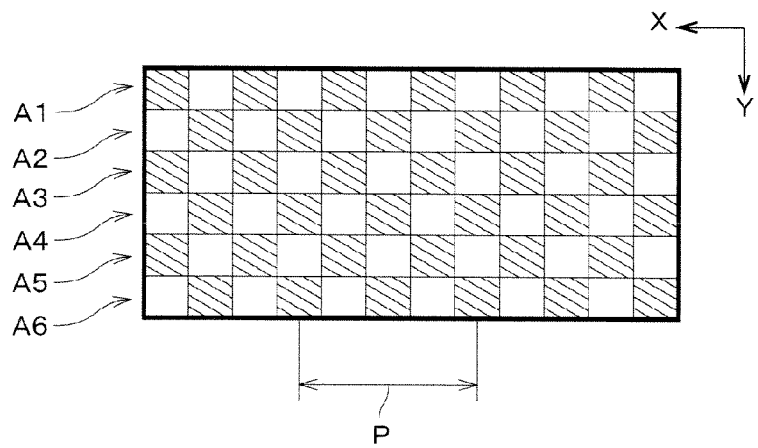
FIGS. 5 and 6 illustrate writing positions of dots on recording paper.

FIG. 5 illustrates some of a plurality of writing positions that are set and arranged on the recording paper 9 as thin-line rectangles. Here, the writing positions are a minimum unit of positions where dots are formed by the ejection of fine droplets of ink from the outlets 241. The pitch of the writing positions in the width direction (X direction) is equal to one-fourth of the outlet pitch P in the outlet rows 251 to 254 shown in FIG. 2. In the following description, clusters of writing positions each aligned in the width direction are respectively referred to as writing position rows A1 to A6. In the present embodiment, the pitch of the writing positions in the movement direction (Y direction) is equal to a value obtained by dividing the row interval W of the first to fourth outlet rows 251 to 254 by 8. In other words, the arrangement of the writing positions in FIG. 5 is the same as the arrangement of positions at which dots are written in the normal writing.

In the writing position row A1, the first outlet row 251 writes a dot every fourth writing position, and the second outlet row 252 writes a dot in a middle position between adjacent dots written by the first outlet row 251. In other words, in the writing position row A1, dots are alternately written every second writing position by the first and second outlet rows 251 and 252. In FIG. 5, writing positions at which dots are written are diagonally hatched (the same applies to FIG. 6). In the writing position row A2, the third outlet row 253 writes a dot every fourth writing position, and the fourth outlet row 254 writes a dot in a middle position between adjacent dots written by the third outlet row 253. In other words, in the writing position row A2, dots are alternately written every second writing position by the third and fourth outlet rows 253 and 254.

The writing of the writing position rows A3 and A5 is performed in the same manner as that of the writing position row A1, and the writing of the writing position rows A4 and A6 is performed in the same manner as that of the writing position row A2. Accordingly, in each of the writing position rows A1 to A6, every second writing position (i.e., every Nth position) is subjected to the ejection operation, and in each cluster of writing positions aligned in the movement direction, every second writing position is subjected to the ejection operation. In other words, the writing positions at which the ejection operation is performed are arranged in a checkerboard (checkered) pattern.

In step S12b described above, a size changing part 451 in FIG. 3 obtains an average of the pixel values of every two adjacent pixels or extracts every second pixel from among, for example, a plurality of pixels aligned in a direction corresponding to the width direction of the original image. This reduces the size of (the number of pixels in) the original image in the direction corresponding to the width direction by half in accordance with the selected x-speed value (a size obtained by dividing the original size by the selected x-speed value). In the processing of step S14b, as previously described, dots are written every second writing position in the width direction. Accordingly, the recorded image obtained by the 2× speed writing is of the same size as the recorded image obtained by the normal writing. After the entire image has been recorded on the recording paper 9, the movement of the recording paper 9 is stopped, and the image recording apparatus 1 ends the 2× speed writing (step S15b).

Figure 6:
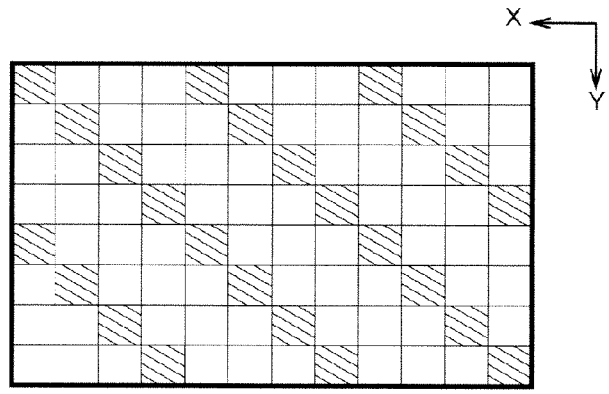

In the image recording apparatus 1, when another selected x-speed value is selected for Nx speed writing in step S10 of FIG. 4, every Nth writing position in each of the writing position rows A1 to A6 (see FIG. 5) is subjected to the ejection operation, and every Nth writing position in each cluster of writing positions aligned in the movement direction is similarly subjected to the ejection operation. In other words, (N−1)th non-writing positions exist between adjacent writing positions. For example, if N=4, in each writing position row and each cluster of writing positions aligned in the movement direction, every forth writing position is subjected to the ejection operation as shown in FIG. 6.

Next is a description of operations performed by the screening part 452 and the generation of a threshold matrix used in the screening part 452.

Figure 7:
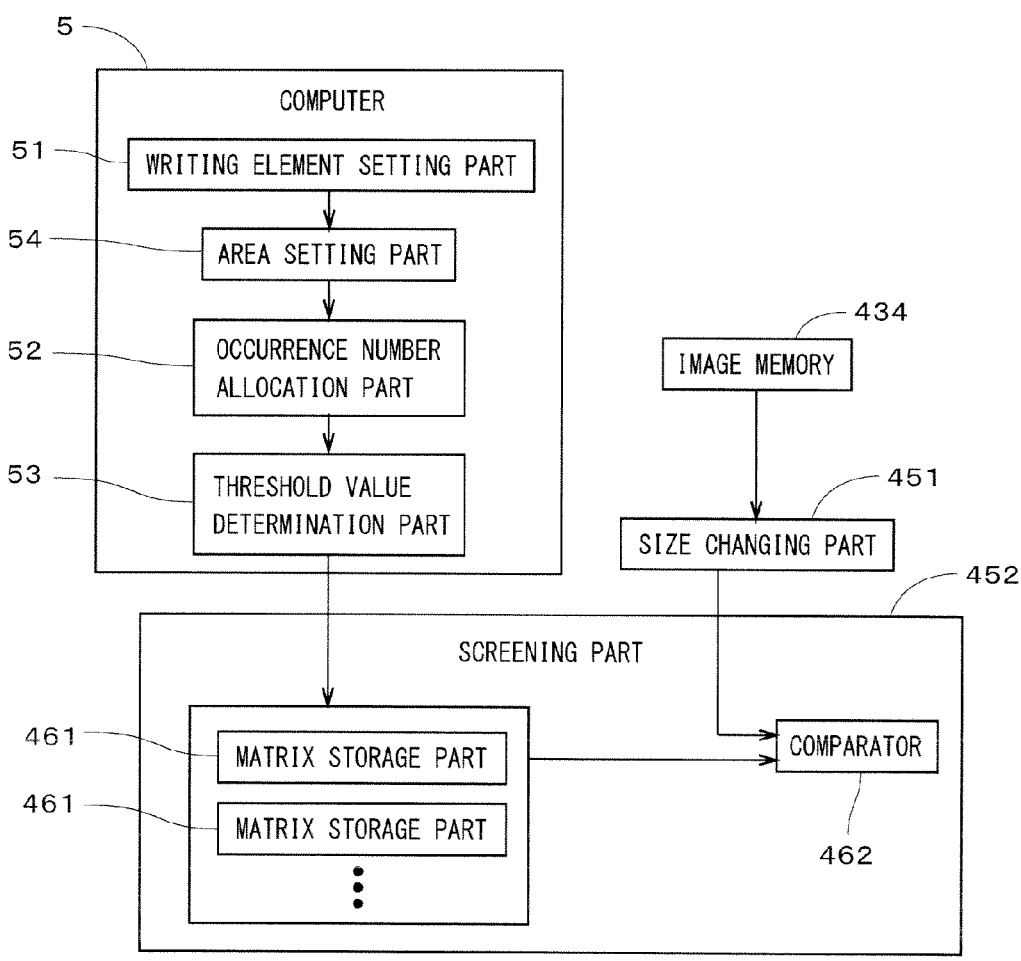
FIG. 7 is a block diagram showing functional configurations of a screening part and a computer.
Figure 8:
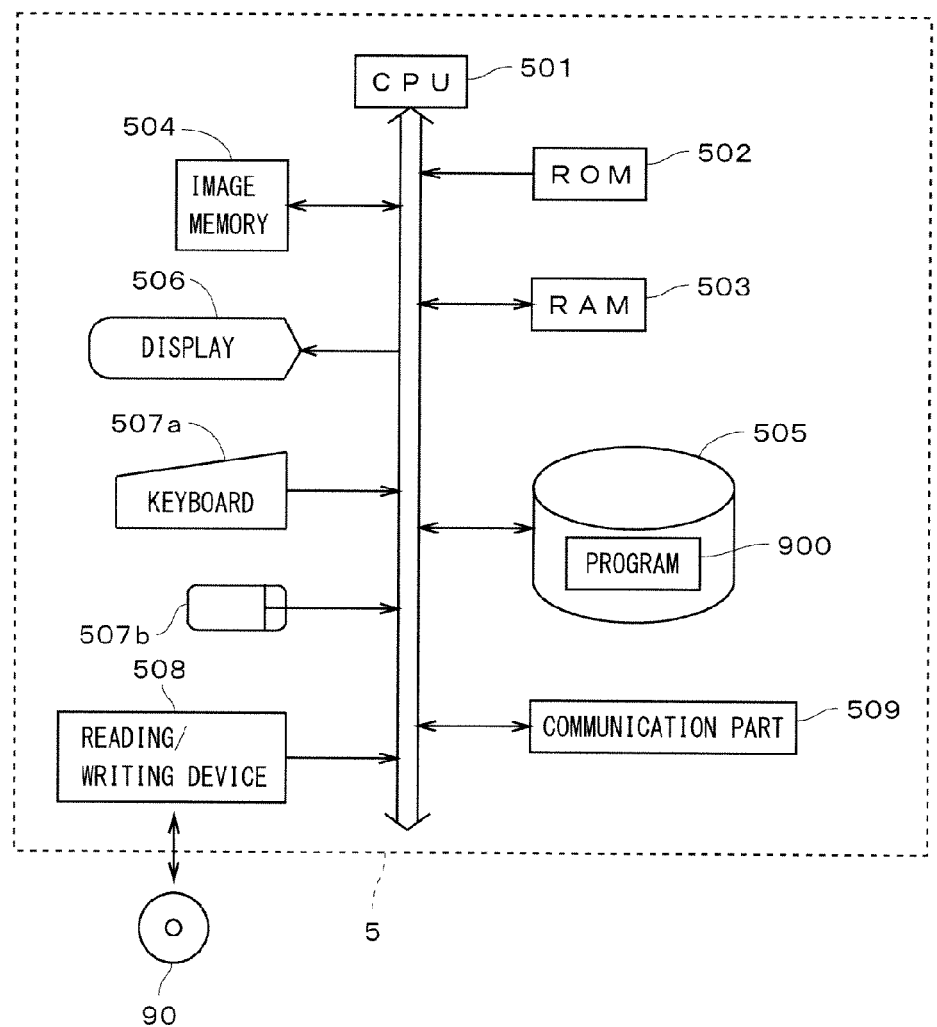
FIG. 8 illustrates a configuration of the computer.

FIG. 7 is a block diagram showing functional configurations of the screening part 452 and the computer 5 together with peripheral functional configurations. The functions of the computer 5 shown are only those related to screening. As shown in FIG. 8, the computer 5 is configured as a general computer system in which a CPU 501 for performing various types of computational processing, a ROM 502 storing a basic program, and a RAM 503 for storing various types of information are connected to a bus line. The bus line is further connected appropriately, via an interface (I/F) or the like, to an image memory 504 for storing data of an original color image to be screened into halftone dots (to be subjected to halftoning), a fixed disk 505 for storing information, a display 506 for displaying various type of information, a keyboard 507a and a mouse 507 for receiving input from an operator, a reading/writing device 508 for reading or writing information from or to a non-transitory computer-readable recording medium 90 such as an optical disk, a magnetic disk or a magneto-optical disk, and a communication part 509 for communicating with the main-unit control part 4 and other devices.

The computer 5 reads out a program 900 from the storage medium 90 via the reading/writing device 508 and stores that program into the fixed disk 505 in advance. By the CPU 501 executing computational processing in accordance with the program 900 using the RAM 503 or the fixed disk 505 as a work area (i.e., by the computer executing the program), the computer 5 performs processing, serving as a threshold matrix generation apparatus for generating a threshold matrix (also referred to as a dither matrix) used to screen the original image into halftone dots. The threshold matrix and the data of the original image stored in the image memory 504 are transferred to the main-unit control part 4 via the communication part 509.

A writing element setting part 51, an occurrence number allocation part 52, a threshold value determination part 53, and an area setting part 54 included in the computer 5 shown in FIG. 7 are functions implemented by the computer 5. Meanwhile, the screening part 452 includes a plurality of matrix storage parts 461 (also referred to as screen pattern memories (SPMs)) that serve as memories respectively storing threshold matrices for a plurality of color components, and a comparator 462 (i.e., a screening circuit) for comparing a multi-tone original image with a threshold matrix for each color component.

The functions of the computer 5 may be implemented by a dedicated electrical circuit, or a dedicated electrical circuit may be used in part to implement these functions. Similarly, the functions of the image data processing part 431 including the screening part 452 may be implemented by a computer, or a dedicated electrical circuit may be used where appropriate to implement these functions. The same applies to the other functional configurations of the main-unit control part 4.

Figure 9:
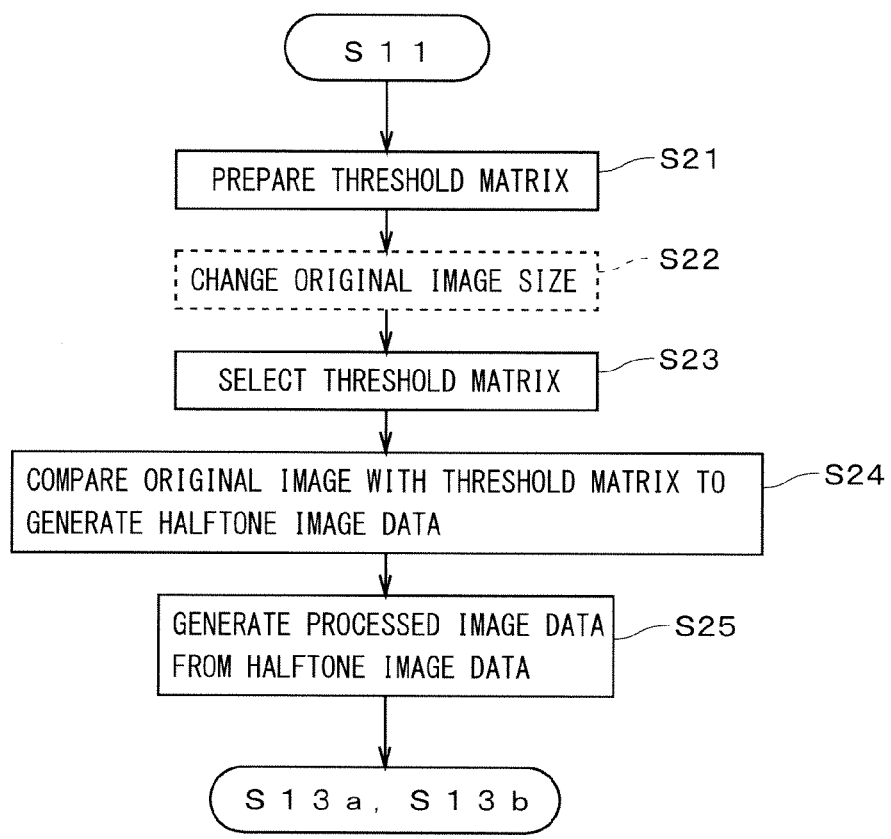
FIG. 9 is a flowchart of processing for generating processed image data.

FIG. 9 is a flowchart of the processing for generating processed image data performed in step S12a or S12b of FIG. 4. The screening part 452 stores threshold matrices necessary for screening of the original image in advance into the matrix storage part 461 as preparation (step S21). Here, threshold matrices corresponding to the normal recording and each Nx speed recording are prepared for each color component of the original image. The following description focuses on only threshold matrices for one color component, but the same applies to threshold matrices for the other color components.

In the case of normal writing, as previously described, the size of the original image remains unchanged. In the case of Nx speed writing, the size of the original image stored in the image memory 434 shown in FIG. 7 is changed by the size changing part 451 (step S22). Also, a threshold matrix corresponding to the changed size of the original image is selected (step S23). Then, the comparator 462 compares the original image with the selected threshold matrix so as to generate halftone image data (step S24). By using the original image whose size is changed as necessary and the threshold matrices corresponding to the size of the original image, it is possible to reduce the amount of computation performed at the time of Nx speed writing.

Figure 10:
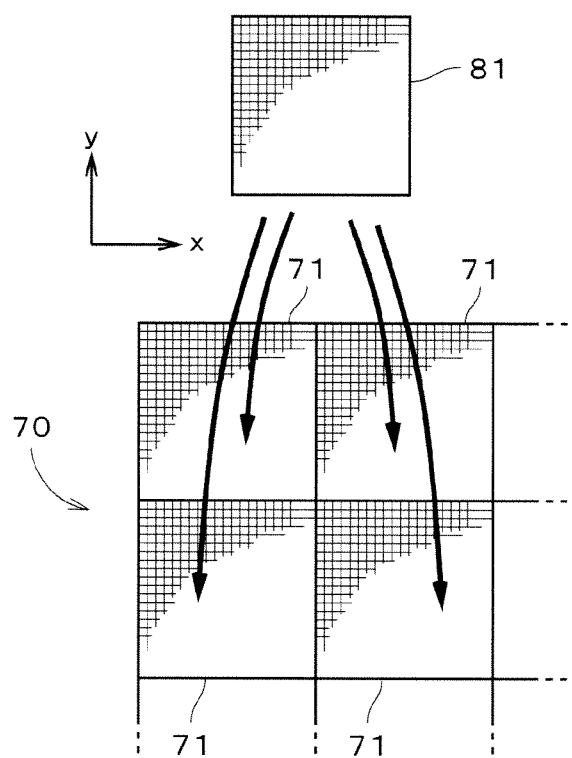
FIG. 10 is an abstract view of a threshold matrix and an original image.

FIG. 10 is an abstract view of a threshold matrix 81 and an original image 70. The threshold matrix 81 has a plurality of elements arranged in a row direction corresponding to the width direction and a column direction corresponding to the movement direction (recording direction). In FIG. 10, the row and column directions of the threshold matrix 81 are respectively indicated as x and y directions (the same applies to FIGS. 12 to 15). The original image 70 also has a plurality of pixels arranged in a direction corresponding to the width direction and a direction corresponding to the movement direction (the same applies to a later-described halftone image). Hereinafter, the directions of the original image 70 that respectively correspond to the width direction and the movement direction are respectively referred to as the "row direction" and the "column direction" as in the case of the threshold matrix 81. The original image is expressed by gradation values ranging from 0 to 255. It is, of course, possible to use a greater number of gradation values.

In the case of screening the original image 70 into halftone dots, the original image 70 is divided into a large number of areas of the same size to set repetitive areas 71 that are a unit of screening, as shown in FIG. 10. If the size of the original image 70 is changed, the size of the repetitive areas 71 will also be changed. The matrix storage parts 461 each have a storage area corresponding to a single repetitive area 71 and store a threshold matrix 81 obtained by setting a threshold value at each address (coordinates) of the storage area. Conceptually, each repetitive area 71 of the original image 70 and the selected threshold matrix 81 are superimposed on each other so that the pixel value of each color component of each pixel in the repetitive area 71 and the corresponding threshold value in the threshold matrix 81 are compared to determine whether or not to perform writing (form a dot of that color) at the position of the pixel on the recording paper 9.

In actuality, the pixel value of one pixel in the original image 70 is acquired on the basis of an address signal given from an address generator of the comparator 462 in FIG. 7. Meanwhile, the address generator also generates an address signal indicating a position corresponding to that pixel of the original image 70 in the repetitive area 71, so that a single threshold value in the threshold matrix 81 is specified and read out from the matrix storage part 461. Then, the pixel value and the threshold value given from the matrix storage part 461 are compared by the comparator 462 so as to determine a pixel value at the position (address) of that pixel in a binary halftone image (output image).

Focusing on one color component, the multi-tone original image 70 shown in FIG. 10 will have, for example, a pixel value of "1" (i.e., a dot placed) at positions where the pixel values are respectively greater than their corresponding threshold values in threshold matrix 81 and will have a pixel value of "0" (i.e., a dot is not placed) at the positions of the remaining pixels. In this way, the screening part 452 generates halftone image data in which the original image 70 is screened into halftone dots, by comparing the multi-tone original image 70 with the threshold matrix 81. The screening part 452 serves as an image data generation part for generating halftone image data.

The halftone image data is divided into data pieces for the respective outlet rows 251 to 254 described above (see FIG. 2). Then, processing corresponding to the actual image recording operation is performed on each of the divided pieces of the halftone image data to generate processed image data (step S25).

Figure 11A:
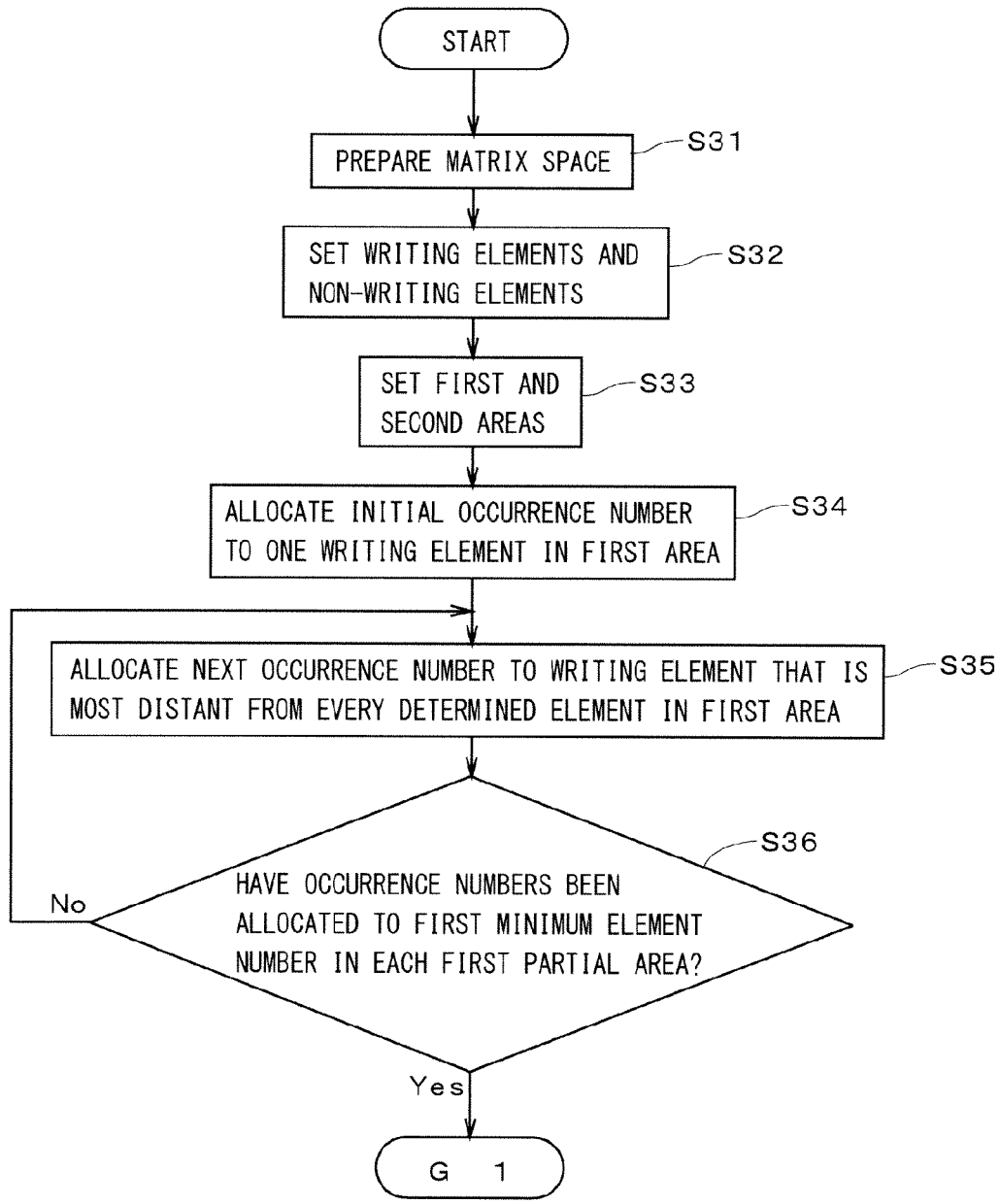
FIGS. 11A and 11B are flowcharts of processing for generating a threshold matrix.
Figure 11B:
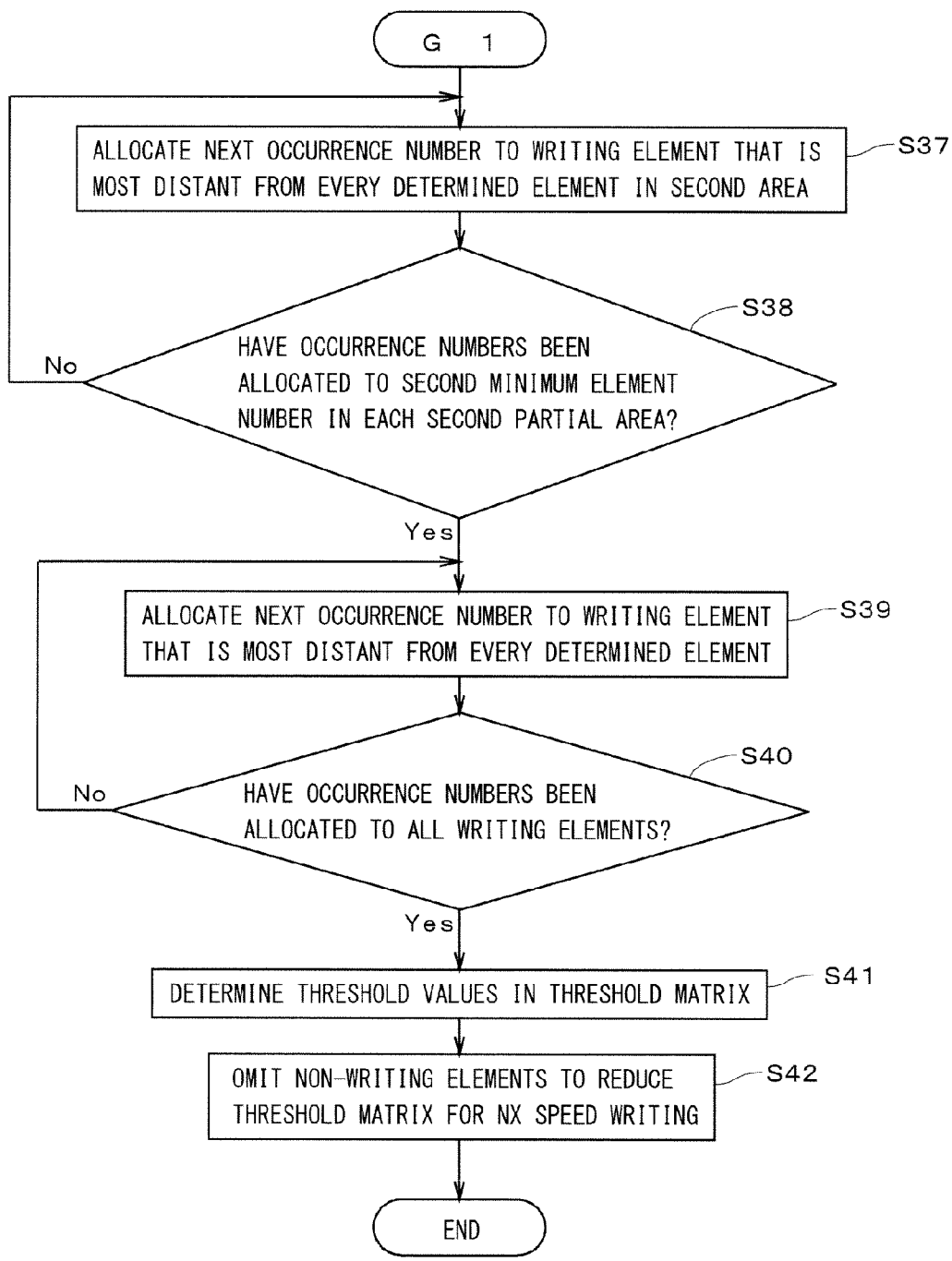

Next, processing for generating a threshold matrix for Nx speed writing, where N is an integer of 2 or more, will be described with reference to FIGS. 11A and 11B. The description here takes the example of the case of generating a threshold matrix when N=2, i.e., a threshold matrix for use in 2× speed writing.

The computer 5 prepares, as a matrix space, a storage area corresponding to a single repetitive area 71 in the case of normal writing (step S31). The matrix space is a cluster of matrix elements arranged in the column direction corresponding to the movement direction (recording direction) in the image recording apparatus 1 and in the row direction perpendicular to the column direction. Each of the matrix elements is capable of storing a single threshold value. The matrix space with threshold values being set forms a threshold matrix.

Figure 12:
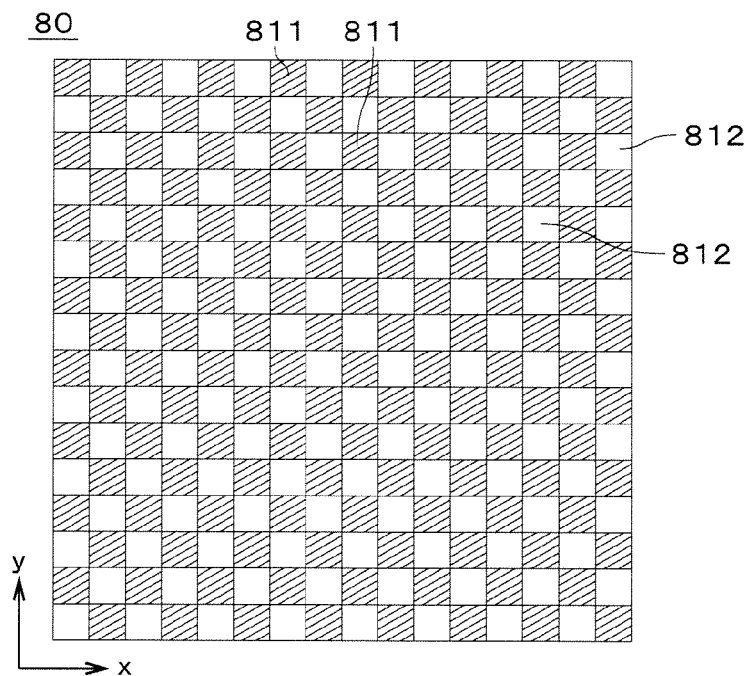
FIGS. 12 through 16 each illustrate a matrix space.

Then, the writing element setting part 51 shown in FIG. 7 sets some of all the matrix elements included in a matrix space 80 as writing elements 811 and sets the other matrix elements, i.e., the matrix elements other than the writing elements 811, as non-writing elements 812 as shown in FIG. 12 (step S32). In FIG. 12, the writing elements 811 are diagonally hatched. The writing elements 811 are writable positions on the recording paper 9 in the Nx speed writing, i.e., matrix elements corresponding to writing positions at which dots can be recorded. The non-writing elements 812 are non-writable positions on the recording paper 9 in the Nx speed writing, i.e., matrix elements corresponding to writing positions at which dots cannot be recorded. The writing elements 811 are located every Nth writing position in the column direction of the matrix space 80 and every Nth writing position in the row direction. In other words, (N−1)th non-writing elements 812 exist between adjacent writing elements 811 in the column direction and the row direction. In this case, since N=2, the writing elements 811 and the non-writing elements 812 are set every second writing position in the row and column directions in a checkerboard pattern as shown in FIG. 12. Note that the preparation of the matrix space 80 and the setting of the writing elements 811 and the non-writing elements 812 may be performed substantially in parallel.

Figure 13:
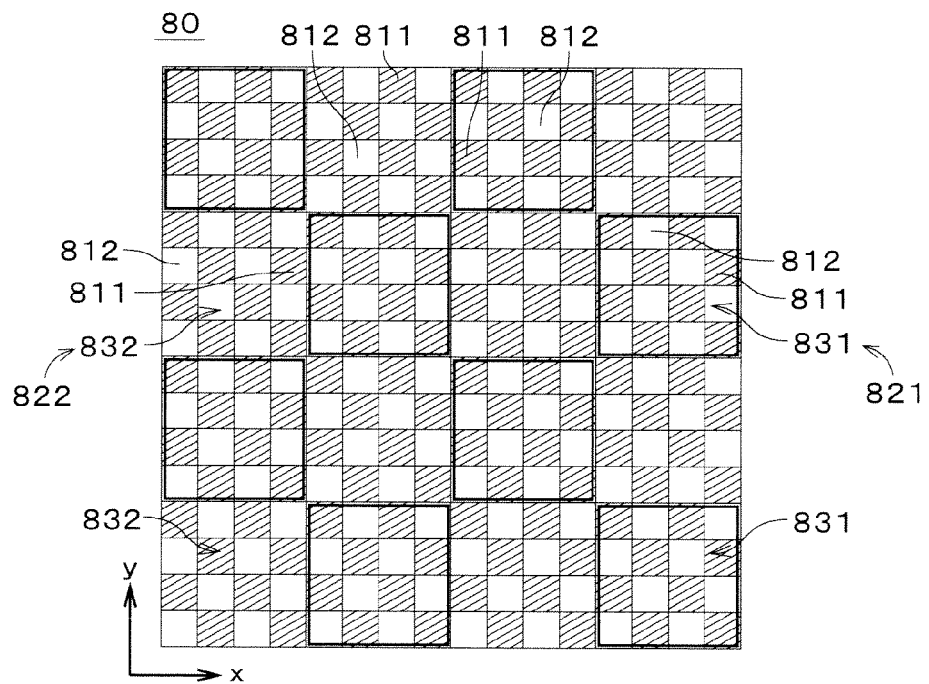

Next, the area setting part 54 shown in FIG. 7 sets a first area 821 that is a cluster of a plurality of first partial areas 831 that are substantially evenly distributed in the matrix space 80 as shown in FIG. 13. In FIG. 13, the first partial areas 831 are each enclosed by thick lines. Each of the first partial areas 831 includes a plurality of writing elements 811. The first partial areas 831 are all of the same size and shape and regularly arranged in the matrix space 80. In the example shown in FIG. 13, the first partial areas 831 are each a square area that includes four matrix elements on each side. Each of the first partial areas 831 includes 16 matrix elements, i.e., eight writing elements 811 and eight non-writing elements 812.

The area setting part 54 also sets a second area 822 that is an area of the matrix space 80 excluding the first area 821 (step S33). Like the first area 821, the second area 822 is a cluster of a plurality of second partial areas 832 that are substantially evenly distributed in the matrix space 80. The second partial areas 832 are all of the same size and shape and regularly arranged in the matrix space 80. In the example shown in FIG. 13, the second partial areas 832 are each a square area that includes four matrix elements on each side, like the first partial areas 831. Each of the second partial areas 832 includes 16 matrix elements, i.e., eight writing elements 811 and eight non-writing elements 812. In other words, the first partial areas 831 and the second partial areas 832 are all of the same size and shape.

In the example shown in FIG. 13, the first area 821 includes eight first partial areas 831, and the second area 822 includes eight second partial areas 832. The plurality of first partial areas 831 and the plurality of second partial areas 832 are alternately aligned in parallel in the x direction, which is the row direction, and are alternately aligned in parallel in the y direction, which is the column direction. In other words, the plurality of first partial areas 831 and the plurality of second partial areas 832 are arranged in a checkerboard (checked) pattern.

Next, the occurrence number allocation part 52 shown in FIG. 7 allocates occurrence numbers to the writing elements 811. The occurrence numbers refer to a sequence of writing positions of dots that appear with increasing gradation value in the original image. The occurrence number allocation part 52 first allocates the initial occurrence number to an arbitrary writing element 811 in the first area 821 (step S34). Hereinafter, such a writing element 811 for which the occurrence number has been determined is referred to as a "determined element," and a writing element 811 for which the occurrence number has not yet been determined is referred to as an "undetermined element."

When one of the writing elements 811 has been determined as a determined element, one undetermined element that is most distant from the determined element is specified in the first area 821, and the next occurrence number is allocated to this undetermined element, which is thus changed into a determined element (step S35). At this time, the fact that the threshold matrix 81 is repetitively applied at the time of screening of the original image 70 is taken into consideration (see FIG. 10), and the calculation of evaluation values is executed on the assumption that the determined element is also similarly present in eight neighboring matrix spaces 80 around the matrix space 80 concerned.

In consideration of the repetitive application of the threshold matrix 81 at the time of screening of the original image 70, the occurrence number allocation part 52 repeatedly performs processing for specifying an undetermined element that is most distant from every determined element in the first area 821 on the basis of the distance from the determined element and allocating the next occurrence number to the specified undetermined element to change the undetermined element into the determined element. Through this, as indicated by the solid portions in FIG. 14, a predetermined number (hereinafter, referred to a "first minimum element number") of writing elements 811 are changed into determined elements 813 in each of the first partial areas 831 (step S36).

Figure 14:
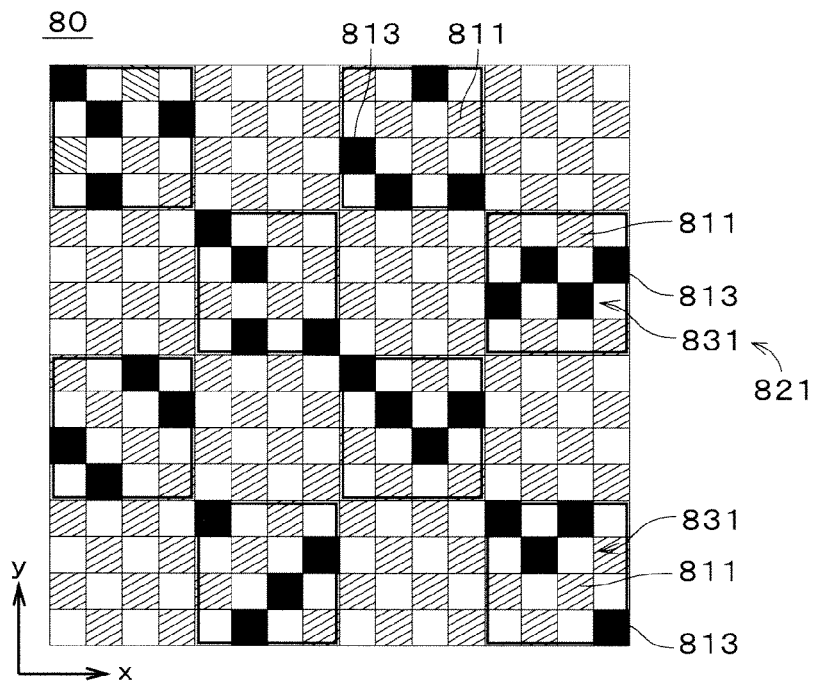

The first minimum element number is an integer of 2 or more, and in the example shown in FIG. 14, the first minimum element number is four. Specifically, in steps S34 to S36, the number of writing elements 811 to be changed into determined elements 813 in each of the first partial areas 831 is four, which is smaller than the number (eight) of all the writing elements 811 included in the first partial area 831. The number of writing elements 811 to be changed into determined elements 813 in each of the first partial areas 831 is 50% of the number of all the writing elements 811 included in the first partial area 831.

Then, in consideration of the repetitive application of the threshold matrix 81 at the time of screening of the original image 70, the occurrence number allocation part 52 repeatedly performs processing for specifying an undetermined element that is most distant from every determined element 813 on the basis of the distance from the determined element 813 and allocating the next occurrence number to the specified undetermined element. Through this, at least one of the writing elements 811 in the second area 822 is allocated an occurrence number and changed into a determined element 813. Specifically, as indicated by the solid portions in FIG. 15, a predetermined number (hereinafter, referred to as a "second minimum element number") of writing elements 811 are allocated occurrence numbers and changed into determined elements 813 in each of the second partial areas 832 (steps S37, S38).

Figure 15:
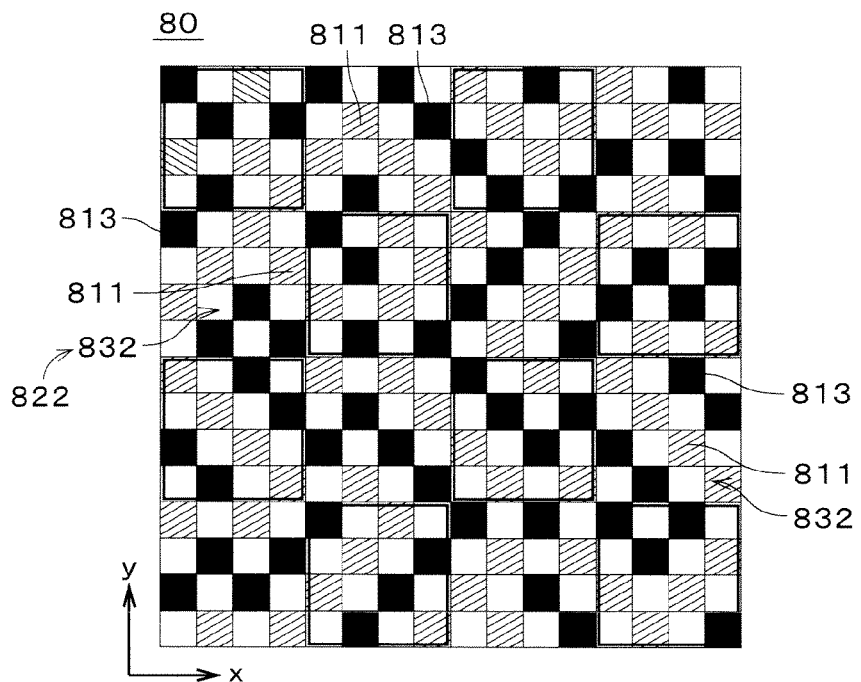

The second minimum element number is an integer of one or more, and in the example shown in FIG. 15, the second minimum element number is four. Specifically, in steps S37 and S38, the number of writing elements 811 to be allocated occurrence numbers and changed into determined elements 813 in each of the second partial areas 832 is four, which is smaller than the number (eight) of all the writing elements 811 included in the second partial area 832. The number of writing elements 811 to be changed into determined elements 813 in each of the second partial areas 832 is 50% of the number of all the writing elements 811 included in the second partial area 832. The second minimum element number is preferably equal to the first minimum element number.

Thereafter, as described above, in consideration of the repetitive application of the threshold matrix 81 at the time of screening of the original image 70, the occurrence number allocation part 52 repeatedly performs processing for specifying an undetermined element that is most distant from every determined element 813 on the basis of the distance from the determined element 813 and allocating the next occurrence number to the specified undetermined element. Through this, the other writing elements 811 (i.e., all undetermined elements in the first area 821 and the second area 822) are changed into determined elements 813 (steps S39, S40).

The specification of a single undetermined element that is most distant from every determined element in steps S35 to S40 is performed based on evaluation values obtained using a predetermined evaluation function. The following description gives an example of the calculation of an evaluation value. In the case of obtaining a writing element 811 to be allocated the nth occurrence number, an evaluation value $Ed_n$ (xd, yd) of an undetermined element having coordinates (xd, yd) in the matrix space 80 is obtained from Eq. 1 below, where r is the number of the center matrix space 80 or one of eight neighboring matrix spaces 80 assumed to be in the neighborhood of the center matrix space 80, and $xd_{mr}$ and $yd_{mr}$ are respectively x- and y-direction positions (coordinate values) of a determined element that has been allocated the mth occurrence number in the rth matrix space 80. Note that n and r in Eq. 1 start from 0. In Eq. 1, B is the weighing factor for biasing an undetermined element to be specified in favor of either the first area 821 or the second area 822. In other words, the weighting factor B is a coefficient for preferentially specifying and changing an undetermined element in the first area 821 or an undetermined element in the second area 822 into a determined element.

$$Ed_n(xd, yd) = \sum_{m=0}^{n-1} \sum_{r=0}^{8} \frac{B}{(xd - xd_{mr})^2 + (yd - yd_{mr})^2} \quad \text{(Eq. 1)}$$

In actuality, in the evaluation function of Eq. 1, the x-direction position $xd_{mr}$ of the mth determined element in the rth matrix space 80 is obtained by adding or subtracting the x-direction size of a matrix space 80 to or from the x-direction position of the corresponding determined element in the center matrix 80 in accordance with the number of the matrix space 80 (i.e., in accordance with the relative positions of the rth matrix space 80 and the center matrix 80), or it is determined as the same as the x-direction position of the corresponding determined element in the center matrix 80. The y-direction position $yd_{mr}$ thereof is obtained by adding or subtracting the y-direction size of matrix spaces 80 to or from the y-direction position of the corresponding determined element in the center matrix space 80 in accordance with the number of the matrix space 80, or it is determined as the same position as the y-direction position of the corresponding determined element in the center matrix space 80.

In the evaluation function of Eq. 1, the evaluation value is obtained by multiplying a sum of reciprocals of squares of distances between each undetermined element in the center matrix space 80 and each determined element in the center matrix space 80 and its eight neighboring matrix spaces 80, which are assumed to be in the vicinity of the center matrix space 80, by the weighting factor B. After the evaluation values have been calculated for all undetermined elements, an undetermined element having the minimum evaluation value is allocated an occurrence number n.

In step S35, the weighting factor B used when the undetermined element for which the evaluation value is to be obtained is located in the first area 821 is smaller than that used when that undetermined element is located in the second area 822. For example, the weighting factor B used when an evaluation value is obtained for an undetermined element located in the first area 821 may be set to 0.1, and the weighting factor B used when an evaluation value is obtained for an undetermined element located in the second area 822 may be set to 1.0. Accordingly, in step S35, an undetermined element in the first area 821 is allocated the next occurrence number and changed into a determined element.

In step S37, the weighting factor B used when an undetermined element for which the evaluation value is to be obtained is located in the first area 821 is greater than that used when that undetermined element is located in the second area 822. For example, the weighting factor B used when an evaluation value is obtained for an undetermined element located in the first area 821 may be set to 1.0, and the weighting factor B used when an evaluation value is obtained for an undetermined element located in the second area 822 may be set to 0.1. Accordingly, in step S37, an undetermined element in the second area 822 is allocated the next occurrence number and changed into a determined element.

In step S39, the weighting factor B used when an undetermined element for which the evaluation value is to be obtained is located in the first area 821 is equal to that used when that undetermined element is located in the second area 822. For example, the weighting factor B used when an evaluation value is obtained for an undetermined element located in the first area 821 may be set to 1.0, and the weighting factor B used when an evaluation value is obtained for an undetermined element located in the second area 822 may be set to 1.0. Accordingly, in step S39, an undetermined element in the first area 821 and an undetermined element in the second area 822 are substantially equally allocated the next occurrence number and changed into determined elements.

Note that in step S39, either one of the weighting factor B used when an evaluation value is obtained for an undetermined element located in the first area 821 and the weighting factor B used when an evaluation value is obtained for an undetermined element located in the second area 822 may be smaller than the other. In this case, among undetermined elements in the first and second areas 821 and 822, an undetermined element located in the area corresponding to the smaller weighting factor B is preferentially changed into a determined element as compared with an undetermined element in the other area.

When the Y-direction resolution Ry of an image to be recorded on the recording paper 9 is different from the X-direction resolution Rx thereof, the image recording apparatus 1 may obtain the evaluation value Ed (xd, yd) from Eq. 2, instead of Eq. 1 described above, using a weighting factor R=Rx/Ry.

$$Ed_n(xd, yd) = \sum_{m=0}^{n-1} \sum_{r=0}^{8} \frac{B}{(xd - xd_{mr})^2 / R + R(yd - yd_{mr})^2} \quad \text{(Eq. 2)}$$

The method of calculating the evaluation value is not limited to Eqs. 1 and 2. For example, the evaluation value for each undetermined element may be obtained by multiplying a sum of distances between the undetermined element and each determined element by the weighting factor B, and an undetermined element having the largest evaluation value may be allocated the next occurrence number. Alternatively, the evaluation value for each undetermined element may be obtained by multiplying the minimum distance among distances between the undetermined element and each determined element by the weighting factor B, and an undetermined element having the largest evaluation value may be allocated the next occurrence number. Regardless of which one of the above methods including the method of Eq. 1, the method of Eq. 2, and any method other than those using Eqs. 1 and 2 is used to calculate the evaluation value, an determined element that is most distant from every determined element is allocated the next occurrence number and changed into a determined element in consideration of the repetitive application of the threshold matrix 81.

Next, the threshold value determination part 53 shown in FIG. 7 generates a threshold matrix for Nx speed writing (step S41). In the case of generating the threshold matrix for Nx speed writing, the threshold value of each writing element 811 is determined in accordance with the occurrence number of the writing element 811. Specifically, the threshold value of each writing element 811 is determined by compressing the occurrence number of the writing element 811 to the range of threshold values that are supposed to be given to matrix elements. For example, the threshold value is obtained by dividing the occurrence number by a number obtained by subtracting one from the number of elements for which threshold values are to be set, then multiplying the resultant value by a number obtained by subtracting one from the number of gradations, and then rounding off the resultant number to the nearest integer. When the number of gradations is 256, any integer from 0 to 255 is given as a threshold value to each writing element 811.

Thereafter, the non-writing elements 812 are omitted and the writing elements 811 are clustered in the row direction, so that the matrix space is reduced by half in the row direction (step S42). As a result, a threshold matrix corresponding to the original image that has been reduced in step S22 of FIG. 9 is obtained. In the screening of step S24, the reduced original image is compared with the threshold matrix for 2× speed writing.

The data of the threshold matrix may be recorded by the reading/writing device 508 shown in FIG. 8 onto a recording medium that is readable and writable by an electronic device (including a computer), and the recording medium may be read out by the main-unit control part 4 and stored in the matrix storage part 461 (see FIG. 7). Alternatively, the recording medium may be read out by another device, and the threshold matrix may be used in that device to generate a halftone image.

While the image recording apparatus 1 is configured such that in steps S37 and S38, the occurrence numbers are allocated to the second minimum element number (an integer of 1 or more) of writing elements 811 among the writing element 811 included in each of the second partial areas 832 as described above, the step of allocating an occurrence number to at least one writing element 811 in the second area 822 and changing that writing element into a determined element may be performed instead of steps S37 and S38. Specifically, the step of allocating an occurrence number to at least one writing element 811 in each of the second partial areas 832 does not necessarily have to be performed between steps S36 and S39, and after step S36 is completed and an occurrence number is allocated to one writing element 811 in the second area 822, the next occurrence number may be allocated to a writing element 811 included in either of the first area 821 and the second area 822.

As described above, the first area 821 and the second area 822 are set in the case of generating the threshold matrix 81 for Nx speed writing, the first area 821 being a cluster of a plurality of first partial areas 831 that are substantially evenly distributed in the matrix space 80 and each include a plurality of writing elements 811, and the second area 822 being an area other than the first area 821 in the matrix space 80. One of the writing elements 811 in the first area 821 is allocated the initial occurrence number and changed into a determined element 813, and then, a writing element 811 (undetermined element) that is most distant from every determined element 813 is specified in the first area 821 on the basis of the distance from the determined element 813, while the repetitive application of the threshold matrix 81 at the time of screening of the original image 70 is taken into consideration. The specified writing element 811 is allocated the next occurrence number and changed into a determined element 813. The occurrence number allocation part 52 repeats the above specification of an undetermined element and the above allocation of an occurrence number to the undetermined element, so that at least two writing elements 811 in each of the first partial areas 831 are changed into determined elements 813.

Then, while the repetitive application of the threshold matrix 81 at the time of screening of the original image 70 is taken into consideration, at least one writing element 811 (undetermined element) in the second area 822 is changed into a determined element 813 and thereafter the other writing elements 811 (undetermined elements) are changed into determined elements 813 by repeating processing for specifying a writing element 811 that is most distant from every determined element 813 on the basis of the distance from the determined element 813 and allocating an occurrence number to the specified writing element 811. Then, the threshold value of each writing element 811 is determined in accordance with the occurrence number so as to obtain the threshold matrix 81 for Nx speed writing, where N=2.

Accordingly, when the image recording apparatus 1 performs writing on a highlight area where the gradation values of the image are relatively low (i.e., an area where the image density is 25% or less), dots are written at only positions on the recording paper 9 that correspond to the writing elements 811 that have been allocated the occurrence numbers in steps S34 to S36. In other words, dots are writable on only a plurality of substantially evenly distributed areas on the recording paper 9 that correspond to a plurality of first partial areas 831.

Here, if it is assumed that an area corresponding to each first partial area 831 on the recording paper 9 is a pseudo halftone area where a single pseudo halftone dot with a variable size is to be written, a pseudo halftone dot is writable in only each pseudo halftone region when the image recording apparatus 1 performs writing on a highlight area, and the size of each pseudo halftone dot will increase with increasing gradation value without changing the number of pseudo halftone dots. In other words, it can be regarded that pseudo AM (amplitude modulated) screening is performed in the screening of the original image 70 when the image recording apparatus 1 performs writing of a highlight area. This results in a reduction in the graininess of the image in the highlight area.

In the writing of a medium-tone region where the gradation values are higher than in the highlight area, at least one dot is written in an area corresponding to the second area 822 on the recording paper 9, and such dots are written in order from the position that is most distant from a plurality of dots written in the aforementioned plurality of pseudo halftone areas. As a result, it is possible to reduce or prevent the occurrence of moires similar to moires that occur in the image when screening is performed through AM screening (i.e., moires occurring due to regular arrangement of halftone dots).

In the image recording apparatus 1 capable of recording an image at 1× speed or at Nx speed, where N is an integer of 2 or more, there is a possibility that fine droplets of ink ejected from the ejecting part 2 will land at positions displaced from predetermined landing positions on the recording paper 9 in the case of high-speed writing at Nx speed. However, the aforementioned screening through pseudo AM screening allows the image recording apparatus 1 to suppress an increase in graininess due to different ink landing positions. The configuration of the image recording apparatus 1 is particularly suitable for a single-pass image recording apparatus in which a difference in the ink landing position has a relatively large influence on the image.

As described above, the first area 821 is a cluster of a plurality of first partial areas 831, and the second area 822 is a cluster of a plurality of second partial areas 832. The first partial areas 831 and the second partial areas 832 are all of the same size and shape. The plurality of first partial areas 831 and the plurality of second partial areas 832 are alternately aligned in parallel in the row direction of the matrix space 80 and alternately aligned in parallel in the column direction of the matrix space 80. This improves uniformity in the distribution of dots to be written in the area corresponding to the first area 821 on the recording paper 9 in the case of writing in a highlight area. In the case of writing in a medium-tone area, it is possible to improve uniformity in the distribution of dots to be written in the area corresponding to the second area 822 on the recording paper 9.

In steps S34 to S36 described above, the number of writing elements 811 to be changed into determined elements 813 in each of the first partial areas 831 is smaller than the number of all the writing elements 811 included in the first partial area 831. Accordingly, it is possible, in the case of writing of a medium-tone area, to suppress an increase in the size of the aforementioned pseudo halftone dots. Consequently, it is possible to further reduce or prevent the occurrence of moires due to regular arrangement of pseudo halftone dots.

As described above, in step S35, the weighting factor B used when an evaluation value is obtained for an undetermined element located in the first area 821 is smaller than the weighting factor B used when an evaluation value is obtained for an undetermined element located in the second area 822. On the other hand, in step S37, the weighting factor B used when an evaluation value is obtained for an undetermined element located in the first area 821 is greater than the weighting factor B used when an evaluation value is used for an undetermined element located in the second area 822. Thus, in steps S37 and S38, an undetermined element located in the second area 822 is more reliably allocated the next occurrence number among all undetermined elements. As a result, in the case of writing of an area, it is possible to preferentially write a dot in the area corresponding to the second area 822 on the recording paper 9 in the case of writing in a portion of the medium-tone area that is close to the highlight area.

Figure 16:
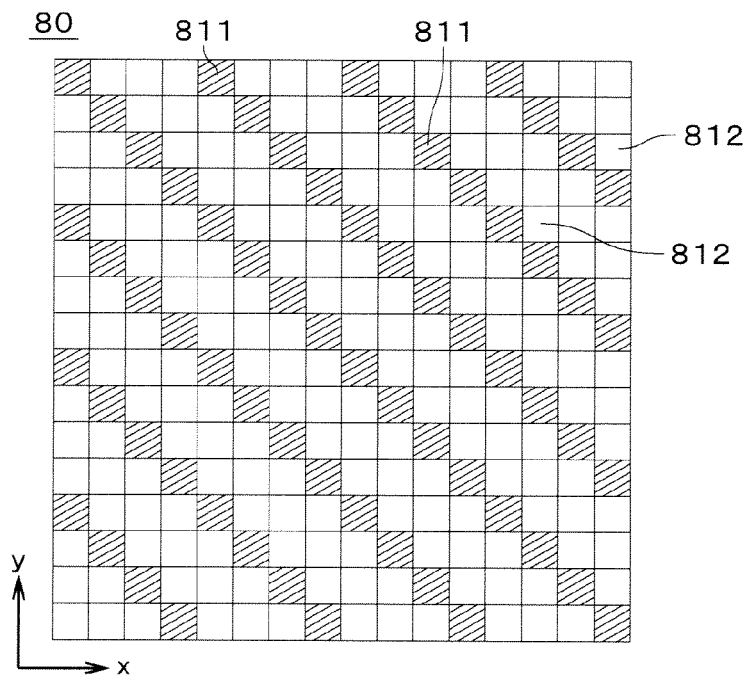

While the above description takes an example of the case where N=2, the generation of a threshold matrix when N is an integer greater than 2 is also performed in the same manner as in steps S31 to S42 described above. For example, when N=4, in step S32, every third matrix element in both the row and column directions are set as writing elements 811, and the other matrix elements are set as non-writing element 812 as shown in FIG. 16.

While the above description takes an example of the case where the outlets 241 of the head parts 23 each eject one size of fine droplets of ink, the image recording apparatus 1 may use head parts 23 that can change the size of fine droplets of ink to be ejected from each of a plurality of outlets 241. By using such head parts 23, it is possible to change the size of dots to be written on the recording paper 9 with fine droplets of ink ejected from the plurality of outlets 241. The following description takes an example of the case where the size of dots to be written on the recording paper 9 can be changed to a "large size," a "medium size," or a "small size." Large-size dots are maximum-size dots that can be expressed by the image recording apparatus 1, and small-size dots are minimum-size dots that can be expressed by the image recording apparatus 1. Medium-size dots are smaller than large-size dots and larger than small-size dots.

Figure 17:
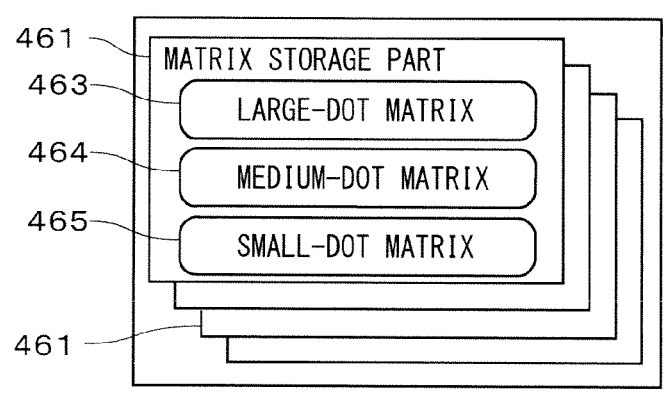
FIG. 17 illustrates matrix sets.

Each of the matrix storage parts 461 shown in FIG. 7 stores a large dot matrix 463 as a threshold matrix for large dots, a medium dot matrix 464 as a threshold matrix for medium dots, and a small dot matrix 465 as a threshold matrix for small dots as shown in FIG. 17.

While FIG. 17 shows the large dot matrix 463, the medium dot matrix 464, and the small dot matrix 465 that are stored in a single matrix storage part 461, the matrix storage parts 461 for the other color components also each store a large dot matrix 463, a medium dot matrix 464, and a small dot matrix 465. In the following description, three threshold matrices including the large dot matrix 463, the medium dot matrix 464, and the small dot matrix 465 are also collectively referred to as a "matrix set." While the following description focuses on a matrix set for one color component, the same also applies to the matrix sets for the other color components. At the same position in the three threshold matrices of a matrix set, the large dot matrix 463 has a largest threshold value, and the small dot matrix 465 has a smallest threshold value. The medium dot matrix 464 has a threshold value between the threshold values of the large dot matrix 463 and the small dot matrix 465.

Figure 18:
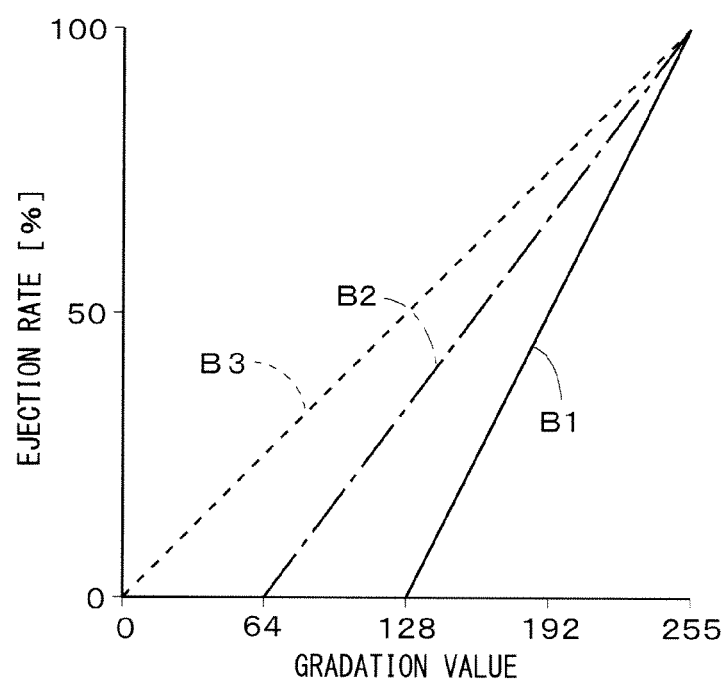
FIG. 18 illustrates characteristics of a matrix set.

FIG. 18 illustrates characteristics of a matrix set. In FIG. 18, the vertical axis indicates an ink ejection rate when the image recording apparatus 1 records an original image with a uniform gradation value, and the horizontal axis indicates the gradation value in the image. Assuming that the number of writing positions defined as positions to which ink dots can be applied in a unit area on the recording paper 9 is a reference number, the aforementioned ejection rate is a value indicating the proportion of the number of dots that are actually ejected from one head part 23 to the unit area to the reference number.

In FIG. 18, the ejection rate for fine droplets of ink of the large size is indicated by a solid line B1. In the following description, the ejection rates for fine droplets of ink of the large size, the medium size, and the small size are respectively referred to as a "large-dot ejection rate," a "medium-dot ejection rate," and a "small-dot ejection rate." In FIG. 18, a sum of the large dot ejection rate and the medium dot ejection rate is indicated by a dashed dotted line B2, and a total ejection rate that is an ejection rate of all the different sized fine droplets of ink is indicated by a broken line B3.

The threshold values in the large dot matrix 463 range from 128 to 255, the threshold values in the medium dot matrix 464 range from 64 to 255, and the threshold values in the small dot matrix 465 range from 0 to 255. As described previously, at the same position in the three matrices of the matrix set, the medium dot matrix 464 has a larger threshold value than the small dot matrix 465, and the large dot matrix 463 has a larger threshold value than the medium dot matrix 464. When a large dot is formed at one writing position, neither a small nor medium dot will be formed at that writing position even if the pixel value exceeds the threshold values of the small dot matrix 465 and the medium dot matrix 464. When a medium dot is formed at one writing position, a small dot will not be formed at that writing position even if the pixel value exceeds the threshold value of the small dot matrix 465.

As illustrated in FIG. 18, as the gradation value in the image increases from 0 to 64, the ejection rate of only small dots linearly increases as indicated by the broken line B3. As the gradation value increases from 64 to 128, the total ejection rate linearly increases with increasing gradation value as indicated by the broken line B3, and the medium-dot ejection rate linearly increases as indicated by the dashed dotted line B2. A difference between the broken line B3 and the dashed dotted line B2 corresponds to the small-dot ejection rate, and the small-dot ejection rate linearly decreases with increasing gradation value.

When the gradation value increases from 128 to 255, the total ejection rate linearly increases to 100% with increasing gradation value as indicated by the broken line B3, and a sum of the large-dot ejection rate and the medium-dot ejection rate linearly increases to 100% as indicated by the dashed dotted line B2. The large-dot ejection rate linearly increases from 0% to 100% with increasing gradation value as indicated by the solid line B1. A difference between the broken line B3 and the dashed dotted line B2 corresponds to the small-dot ejection rate, and the small-dot ejection rate linearly decreases to 0% with increasing gradation value. A difference between the dashed dotted line B2 and the solid line B1 corresponds to the medium-dot ejection rate, and the medium ejection rate linearly decreases to 0% with increasing gradation value.

In the case of generating a matrix set for Nx speed writing, a temporary threshold matrix serving as a basis is generated by the aforementioned method of generating the threshold matrix 81. Then, the range of threshold values in the temporary threshold matrix is narrowed as necessary in accordance with each tonal range where large dots, medium dots, or small dots appear, and an offset value is added as necessary to each threshold value so that the minimum threshold value is suitable for use as an occurrence start gradation value of a dot of a corresponding size.

In the case of the large dot matrix 463, since the tonal range where large dots appear is from 128 to 255, the range of threshold values in the temporary threshold matrix is narrowed to a half, and an offset value of 128 is added to each threshold value because the occurrence start gradation value is 128. In the case of the medium dot matrix 464, since the tonal range where medium dots appear is from 64 to 255, the range of threshold values in the temporary threshold matrix is narrowed by one quarter, and an offset value of 64 is added to each threshold value because the occurrence start gradation value is 64.

In the case of using a matrix set having the characteristics as shown in FIG. 18, the image recording apparatus 1 can write only small dots on the recording paper 9 in the range where the gradation value is greater than or equal to "0", which is the minimum gradation value that can be expressed on the recording paper 9, and less than or equal to "64," which is a predetermined gradation value. In this way, in the writing of a highlight area where the gradation values in the image are relatively small (i.e., an area where the image density is 25% or less), the image recording apparatus 1 can reduce the graininess of the image by writing only small dots on the recording paper 9. As compared with the cases of medium-size dots and large-size dots, the landing positions of small-size dots on the recording paper 9 are unstable, and therefore, small-size dots may land at positions different from desired positions. However, an increase in graininess due to different landing positions can be suppressed by performing screening through pseudo AM screening in the writing of a highlight area. Consequently, even the image recording apparatus 1 capable of changing the size of dots can reduce the graininess of an image in a highlight area.

In the above description of the image recording apparatus 1, the non-writing elements 812 for Nx speed writing are set in correspondence with non-writable positions on the recording paper 9. However, if each outlet row can perform an ejection operation with any arbitrary timing, the non-writing elements 812 are not limited to non-writable positions, and N above is not limited to the submultiples of the number of outlet rows. In this case, N can be set to any arbitrary integer of 2 or more. The recording speed of the image recording apparatus 1 and the arrangement of the writing elements 811 and the non-writing elements 812 in the threshold matrix can be changed in various ways according to the value of N.

While the above has been a description of the configuration and operation of the image recording apparatus 1 and the generation of a threshold matrix, various modifications are possible.

In the above description, high-precision, high-speed image recording is readily implemented by arranging a plurality of outlet rows in the head parts 23 and causing all outlets in the outlet rows to simultaneously perform an ejection operation at a fixed cycle. Alternatively, the image recording apparatus 1 may be provided with a single outlet row having a plurality of outlets that can individually change the timing of ejection, while each repeating an ejection operation at a basic cycle.

The first partial areas 831 of the first area 821 may be of various sizes or shapes as long as they each include at least two writing elements. The size and shape of the first partial areas 831 may be changed in various ways according to the output resolution of the image recording apparatus 1, for example. While in the example shown in FIG. 13, the first partial areas 831 are arranged such that their vertices are in contact with one another, the arrangement may be such that the first partial areas 831 are spaced from one another and evenly distributed in the matrix space 80. In this case, the second area 822 will not include a plurality of second partial areas 832 and will be a continuous area that surrounds the respective first partial areas 831.

While the above description regarding the generation of the threshold matrix for Nx speed writing takes an example of the case where the first minimum element number in steps S34 to S36 is four, the first minimum element number may be any integer that is 2 or more and less than or equal to the number of all the writing elements 811 included in each of the first partial areas 831. If the first minimum element number is equal to the number of all the writing elements 811 included in each of the first partial areas 831, occurrence numbers are allocated to all of the writing elements 811 in the first partial area 831 in steps S34 to S36, and then the procedure proceeds to step S37.

In the case of normal writing (i.e., 1× speed writing), the image recording apparatus 1 may use various methods to generate a threshold matrix.

Although, in the image recording apparatus 1, the recording paper 9 is moved in the movement direction relative to the head parts 23 by the movement mechanism 3 for moving a recording object, a movement mechanism for moving the head parts 23 in the Y direction may be provided instead. Alternatively, image recording may be implemented by the head parts 23 moving in both the X and Y directions relative to the recording paper 9. In the image recording apparatus 1, the recording paper 9 may be a piece of sheet, and pieces of recording paper 9 may be transferred sequentially. In this way, a movement mechanism for relatively moving the recording paper 9 relative to the head parts 23 in the movement direction at a constant normal speed or at a speed that is N times the normal speed can be achieved by various configurations.

It is, however, noted that the aforementioned technique for recording a high-precision image at high speed on the recording paper 9 is preferably adopted in a high-speed image recording apparatus in which a plurality of outlets included in the head parts 23 are arranged across the entire width of the recording area of the recording paper 9, and recording is completed through only one-pass of the recording paper 9 under the head parts 23 (so-called single-pass printing). In this case, it is possible to further reduce the amount of time required to record an image on the recording paper 9.

The above-described threshold matrix may be used in other image recording apparatuses involved in the creation of printed matter, such as an electrophotographic printer or a plate making apparatus for CTP (Computer To Plate). In this way, the above-described threshold matrix can be used in various image recording apparatuses that include a head part having a plurality of dot output elements for writing a dot at a plurality of writing positions, which are aligned in the width direction perpendicular to a predetermined movement direction, on a recording object, and a movement mechanism for moving a plurality of writing positions on the recording object relative to the recording object in the movement direction.

While the above description takes an example of the case where the main-unit control part 4 serves as an image data generation apparatus for generating image data, the function of the image data generation apparatus may be provided independently of the main unit 10. Also, halftone image data may be used in various applications other than printing, such as displaying an image on a display.

While the above description takes an example of the case of recording (i.e., writing) an image at Nx speed in which the size of the original image is reduced in the row direction and a threshold matrix suitable for the reduced original image, screening may be performed without reducing the size of the original image. In this case, a matrix including non-writing elements is used as a threshold matrix.

In the case of obtaining an evaluation value for an undetermined element, weighing may be performed according to not only the distances from determined elements but also the direction in which the determined elements are present. Obtaining an occurrence number using an evaluation value is substantially equivalent to obtaining a disappearance number using an evaluation value. For example, writing positions at which dots are not formed may be determined in the order of occurrence numbers obtained as described above, as the gradation value decreases from the maximum value.

The generation of a threshold matrix in consideration of non-writing elements is applicable to various apparatuses that have limitations with respect to writing positions, and is not limited for use in apparatuses provided with the aforementioned head parts.

The configurations of the above-described preferred embodiments and variations may be appropriately combined as long as there are no mutual inconsistencies.

While the invention has been shown and described in detail, the foregoing description is in all aspects illustrative and not restrictive. It is therefore understood that numerous modifications and variations can be devised without departing from the scope of the invention. This application claims priority benefit under 35 U.S.C. Section 119 of Japanese Patent Application No. 2013-134909 filed in the Japan Patent Office on Jun. 27, 2013, the entire disclosure of which is incorporated herein by reference.

REFERENCE SIGNS LIST

1 Image recording apparatus
3 Movement mechanism
4 Main-unit control part
5 Computer
9 Recording paper
23 Head part
41 Drive mechanism control part
42 Timing control part
44 Overall control part
70 Original image
80 Matrix space
81 Threshold matrix
91 Dot
241, 241a to 241e Outlet
432 Head control part
452 Halftoning part
461 Matrix storage part
811 Writing element
812 Non-writing element
813 Determined element
821 First area
822 Second area
831 First partial area
832 Second partial area
900 Program
S10, S11, S12a to S15a, S12b to S15b, S21 to S25, S31 to S42 Step

The invention claimed is:

1. A threshold matrix generation method of generating a threshold matrix for Nx speed writing to be compared with a multi-tone original image when said original image is screened into halftone dots for Nx speed writing by an image recording apparatus capable of recording an image at 1× speed or at Nx speed, where N is an integer of 2 or more, the method comprising:

a) preparing a matrix space that is a set of matrix elements arranged in row and column directions, said row direction being perpendicular to said column direction, and said column direction corresponding to a recording direction of said image recording apparatus;

b) setting every Nth matrix element aligned in said column direction and every Nth matrix element aligned in said row direction as writing elements and setting the other matrix elements as non-writing elements, said writing elements being matrix elements that correspond to writing positions on a recording object at the time of Nx speed writing;

c) setting a first area and a second area, said first area being a cluster of a plurality of first partial areas that are substantially evenly distributed in said matrix space and each include a plurality of writing elements, and said second area being the area of said matrix space excluding said first area;

d) changing at least two writing elements in each of said first partial areas into determined elements by first allocating an initial occurrence number to one writing element in said first area to determine said one writing element as a determined element and then, in consideration of repetitive application of said threshold matrix when performing screening of said original image, repeating processing for specifying a writing element that is distant from every determined element in said first area on the basis of a distance from said every determined element and for allocating the next occurrence number to the specified writing element to change the specified writing element into a determined element;

e) after said operation d), changing at least one writing element in said second area into a determined element and then changing another writing element into a determined element by repeatedly specifying a writing element that is distant from every determined element on the basis of a distance from said every determined element and allocating an occurrence number to the specified writing element, in consideration of repetitive application of said threshold matrix when performing screening of said original image; and f) determining a threshold value of each writing element in accordance with said occurrence number to obtain a threshold matrix for Nx speed writing.

2. The threshold matrix generation method according to claim 1, wherein said N is 2.

3. The threshold matrix generation method according to claim 2, wherein
said second area is a cluster of a plurality of second partial areas,
said first partial areas and said second partial areas are all of the same size and shape, and
said plurality of first partial areas and said plurality of second partial areas are alternately aligned in parallel in said row direction and alternately aligned in parallel in said column direction.

4. The threshold matrix generation method according to claim 3, wherein
in said operation d), the number of writing elements to be changed into determined elements in each of said first partial areas is smaller than the number of writing elements included in said each of said first partial areas.

5. The threshold matrix generation method according to claim 1, wherein
said second area is a cluster of a plurality of second partial areas,
said first partial areas and said second partial areas are all of the same size and shape, and
said plurality of first partial areas and said plurality of second partial areas are alternately aligned in parallel in said row direction and alternately aligned in parallel in said column direction.

6. The threshold matrix generation method according to claim 5, wherein in said operation d), the number of writing elements to be changed into determined elements in each of said first partial areas is smaller than the number of writing elements included in said each of said first partial areas.

7. The threshold matrix generation method according to claim 1, wherein in said operation d), the number of writing elements to be changed into determined elements in each of said first partial areas is smaller than the number of writing elements included in said each of said first partial areas.

8. An image data generation method of generating image data, comprising:

preparing a threshold matrix that is generated by the threshold matrix generation method according to claim 1; and comparing a multi-tone original image with said threshold matrix to generate halftone image data obtained by screening said original image into halftone dots.

9. An image data generation apparatus for generating image data, comprising:

a matrix storage part for storing a threshold matrix that is generated by the threshold matrix generation method according to claim 1; and an image data generation unit for comparing a multi-tone original image with said threshold matrix to generate halftone image data obtained by screening said original image into halftone dots.

10. An image recording apparatus comprising:

a head part including a plurality of dot output elements that respectively write dots at a plurality of writing positions on a recording object, said plurality of writing positions being aligned in a width direction perpendicular to a recording direction;

a movement mechanism for moving said plurality of writing positions on said recording object relative to said recording object in said recording direction;

a matrix storage part for storing a threshold matrix that is generated by the threshold matrix generation method according to claim 1;

an image data generation part for comparing a multi-tone original image with said threshold matrix to generate halftone image data obtained by screening said original image into halftone dots; and a control part for performing output control of said plurality of dot output elements on the basis of said halftone image data, in parallel with movement of said plurality of writing positions on said recording object relative to said recording object.

11. The image recording apparatus according to claim 10, wherein when an image is recorded at Nx speed, said non-writing elements correspond to non-writable positions on said recording object.

12. The image recording apparatus according to claim 11, wherein image recording is performed through one pass of said head part over each position on said recording object.

13. The image recording apparatus according to claim 12, wherein sizes of dots to be written by said plurality of dot output elements are changeable, and only a minimum-sized dot is writable on said recording object in a range where a gradation value is greater than or equal to a minimum gradation value that can be expressed on said recording object and less than or equal to a predetermined gradation value.

14. The image recording apparatus according to claim 10, wherein image recording is performed through one pass of said head part over each position on said recording object.

15. The image recording apparatus according to claim 14, wherein sizes of dots to be written by said plurality of dot output elements are changeable, and only a minimum-sized dot is writable on said recording object in a range where a gradation value is greater than or equal to a minimum gradation value that can be expressed on said recording object and less than or equal to a predetermined gradation value.

16. The image recording apparatus according to claim 10, wherein sizes of dots to be written by said plurality of dot output elements are changeable, and only a minimum-sized dot is writable on said recording object in a range where a gradation value is greater than or equal to a minimum gradation value that can be expressed on said recording object and less than or equal to a predetermined gradation value.

17. A non-transitory computer-readable recording medium storing a threshold matrix for Nx speed writing to be compared with a multi-tone original image when said original image is screened into halftone dots for Nx speed writing by an image recording apparatus capable of recording an image at 1× speed or at Nx speed, where N is an integer of 2 or more, said threshold matrix being generated by the threshold matrix generation method according to claim 1.

18. A non-transitory computer-readable recording medium storing a program for causing a computer to generate a threshold matrix for Nx speed writing to be compared with a multi-tone original image when said original image is screened into halftone dots for Nx speed writing by an image recording apparatus capable of recording an image at 1× speed or at Nx speed, where N is an integer of 2 or more, said program causing said computer to execute:

a) preparing a matrix space that is a set of matrix elements arranged in row and column directions, said row direction being perpendicular to said column direction, and said column direction corresponding to a recording direction of said image recording apparatus;

b) setting every Nth matrix element aligned in said column direction and every Nth matrix element aligned in said row direction as writing elements and setting the other matrix elements as non-writing elements, said writing elements being matrix elements that correspond to writing positions on a recording object at the time of Nx speed writing;

c) setting a first area and a second area, said first area being a cluster of a plurality of first partial areas that are substantially evenly distributed in said matrix space and each include a plurality of writing elements, and said second area being an area of said matrix space excluding said first area;

d) changing at least two writing elements in each of said first partial areas into determined elements by first allocating an initial occurrence number to one writing element in said first area to determine said one writing element as a determined element and then, in consideration of repetitive application of said threshold matrix when performing screening of said original image, repeating processing for specifying a writing element that is distant from every determined element in said first area on the basis of a distance from said every determined element and for allocating the next occurrence number to the specified writing element to change the specified writing element into a determined element;

e) after said operation d), changing at least one writing element in said second area into a determined element and then changing another writing element into a determined element by repeatedly specifying a writing element that is distant from every determined element on the basis of a distance from said every determined element and allocating an occurrence number to the specified writing element, in consideration of repetitive application of said threshold matrix when performing screening of said original image; and f) determining a threshold value of each writing element in accordance with said occurrence number to obtain a threshold matrix for Nx speed writing.

\* \* \* \* \*